US012722719B2

(12) United States Patent
Yang et al.

(10) Patent No.: US 12,722,719 B2
(45) Date of Patent: Sep. 1, 2026

(54) IMPACT RESISTANT UNDERBODY SHIELD MATERIALS AND ARTICLES AND METHODS OF USING THEM

(71) Applicants: Yankai Yang, Lynchburg, VA (US); Anthony J Messina, Macomb, MI (US); Mark O. Mason, Covington, VA (US)

(72) Inventors: Yankai Yang, Lynchburg, VA (US); Anthony J Messina, Macomb, MI (US); Mark O. Mason, Covington, VA (US)

(73) Assignee: Hanwha Azdel, Inc., Forest, VA (US)

( * ) Notice: Subject to any disclaimer, the term of this patent is extended or adjusted under 35 U.S.C. 154(b) by 558 days.

(21) Appl. No.: 17/069,650

(22) Filed: Oct. 13, 2020

(65) Prior Publication Data

US 2021/0139080 A1 May 13, 2021

Related U.S. Application Data

(63) Continuation of application No. 15/179,411, filed on Jun. 10, 2016, now abandoned.

(Continued)

(51) Int. Cl.

*B62D 29/04* (2006.01)
*B32B 3/08* (2006.01)

(Continued)

(52) U.S. Cl.

CPC .............. *B62D 29/041* (2013.01); *B32B 3/08* (2013.01); *B32B 5/02* (2013.01); *B32B 5/024* (2013.01); *B32B 5/028* (2013.01); *B32B 5/08* (2013.01); *B32B 5/245* (2013.01); *B32B 5/26* (2013.01); *B32B 7/12* (2013.01); *B32B 27/065* (2013.01); *B32B 27/12* (2013.01); *B32B 27/285* (2013.01); *B32B 27/288* (2013.01); *B32B 27/302* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 27/42* (2013.01);

(Continued)

(58) Field of Classification Search

CPC ................ B32B 2605/00; B32B 37/06; B32B 2038/0084; B32B 2038/0088; B32B 2266/025; B32B 2323/10; B62D 29/041

See application file for complete search history.

(56) References Cited

U.S. PATENT DOCUMENTS

RE44,893 E * 5/2014 Raghavendran ....... D21H 21/34 428/412
2008/0070019 A1* 3/2008 Good ...................... D06B 1/00 428/218

(Continued)

*Primary Examiner* — Carson Gross
(74) *Attorney, Agent, or Firm* — Rhodes IP PLC; Christopher R Rhodes

(57) ABSTRACT

Underbody shield materials that can provide an underbody shield with high impact resistance are described. In some configurations, an underbody shield composition comprises a porous core layer comprising a plurality of reinforcing fibers, a lofting agent and a thermoplastic material. In some instances, the underbody shield composition may also comprise a film such that an underbody shield produced from the composition can withstand at least 50 individual impacts as tested using a SAE J400 protocol.

16 Claims, 9 Drawing Sheets

Related U.S. Application Data

(60) Provisional application No. 62/175,004, filed on Jun. 12, 2015.

(51) Int. Cl.

| | |
|---|---|
| ***B32B 5/02*** | (2006.01) |
| ***B32B 5/08*** | (2006.01) |
| ***B32B 5/24*** | (2006.01) |
| ***B32B 5/26*** | (2006.01) |
| ***B32B 7/12*** | (2006.01) |
| ***B32B 27/06*** | (2006.01) |
| ***B32B 27/12*** | (2006.01) |
| ***B32B 27/28*** | (2006.01) |
| ***B32B 27/30*** | (2006.01) |
| ***B32B 27/32*** | (2006.01) |
| ***B32B 27/34*** | (2006.01) |
| ***B32B 27/36*** | (2006.01) |
| ***B32B 27/40*** | (2006.01) |
| ***B32B 27/42*** | (2006.01) |
| ***B32B 37/02*** | (2006.01) |
| ***B32B 37/06*** | (2006.01) |
| ***B32B 37/24*** | (2006.01) |
| ***B60R 13/08*** | (2006.01) |
| ***B62D 29/00*** | (2006.01) |
| *B29C 70/34* | (2006.01) |
| *B32B 38/00* | (2006.01) |
| *B32B 38/16* | (2006.01) |
| *B62D 25/20* | (2006.01) |
| *B62D 35/02* | (2006.01) |

(52) U.S. Cl.

CPC .............. *B32B 37/02* (2013.01); *B32B 37/06* (2013.01); *B32B 37/24* (2013.01); *B60R 13/0861* (2013.01); *B62D 29/001* (2013.01); *B29C 70/34* (2013.01); *B32B 2037/243* (2013.01); *B32B 2038/0084* (2013.01); *B32B 2038/0088* (2013.01); *B32B 2038/168* (2013.01); *B32B 2260/021* (2013.01); *B32B 2260/046* (2013.01); *B32B 2262/02* (2013.01); *B32B 2262/0269* (2013.01); *B32B 2262/101* (2013.01); *B32B 2262/103* (2013.01); *B32B 2262/105* (2013.01); *B32B 2262/106* (2013.01); *B32B 2262/108* (2013.01); *B32B 2262/12* (2013.01); *B32B 2262/14* (2013.01); *B32B 2266/06* (2013.01); *B32B 2270/00* (2013.01); *B32B 2274/00* (2013.01); *B32B 2307/558* (2013.01); *B32B 2307/732* (2013.01); *B32B 2309/105* (2013.01); *B32B 2451/00* (2013.01); *B32B 2571/00* (2013.01); *B32B 2605/08* (2013.01); *B62D 25/2072* (2013.01); *B62D 35/02* (2013.01)

(56) References Cited

U.S. PATENT DOCUMENTS

| | | | | |
|---|---|---|---|---|
| 2010/0021718 A1* | 1/2010 | Vos | B32B 27/18 | 428/317.9 |
| 2014/0051310 A1* | 2/2014 | Kunal | B29D 7/01 | 428/221 |

* cited by examiner

IMPACT RESISTANT UNDERBODY SHIELD MATERIALS AND ARTICLES AND METHODS OF USING THEM

PRIORITY APPLICATION

This application is related to and claims the benefit of and priority to U.S. Provisional Application No. 62/175,004 filed on Jun. 12, 2015, the entire disclosure of which is hereby incorporated herein by reference for all purposes.

TECHNOLOGICAL FIELD

This application is related to underbody shield materials that provide impact resistance. More particularly, certain embodiments described herein are directed to underbody shield materials that can be used in an impact resistant underbody shield that comprises a core layer and a film together effective to provide the impact resistance.

BACKGROUND

Articles for automotive and construction materials applications typically are designed to meet a number of competing and stringent performance specifications.

SUMMARY

Certain configurations are described herein that are directed to materials which can be used in multi-layer assemblies, and components thereof, that provide impact resistance as tested according to SAE Standard J400 dated Oct. 23, 2012 (referred to hereafter as "a gravelometer test"), which is similar to ASTM D3170-14 dated Jul. 1, 2014. For example, the materials can be used to produce a composite article that can withstand 50 or more individual impacts, e.g., 100 or more individual impacts, as provided under the gravelometer test conditions, without any substantial damage or effects to the article.

In one aspect, an underbody shield composition comprising a thermoplastic core layer comprising a web of open celled structures defined by random crossing over of reinforcing fibers held together by a thermoplastic polymer, the thermoplastic core layer further comprising a lofting agent effective to increase a thickness of the core layer upon exposure to heat to provide a post lofted core layer, and a film disposed on a first surface of the core layer, in which the post lofted core layer and film together provide an underbody shield article that can withstand at least 50 individual impacts according to a SAE J400 protocol without damage to the film is provided.

In certain embodiments, the film is a homopolymer or copolymer film, e.g., an impact modified homopolymer or copolymer film. In other embodiments, the homopolymer is a polyolefin. In some instances, the thermoplastic polymer is present at 50 weight percent or more in the core layer. In other embodiments, the film is at least 10 mils thick. In some examples, the lofting agent is present at 4 percent by weight or more in the core layer. In other examples, the reinforcing fibers are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In certain embodiments, the thermoplastic polymer is a polymer resin that is selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof. In some examples, the thermoplastic core layer comprises polypropylene, glass fibers and microsphere lofting agents, and in which the film is a polypropylene homopolymer film. In other examples, the film is directly disposed on the first surface of the core layer without any intervening layer or material. In some instances, the composition may comprise a scrim disposed on a second surface of the core layer opposite the first surface of the core layer. In certain examples, the scrim comprises glass fibers, aramid fibers, graphite fibers, carbon fibers, inorganic mineral fibers, metal fibers, metalized synthetic fibers, and metalized inorganic fibers. In other examples, the composition comprises an additional skin layer disposed on the scrim. In some embodiments, the thermoplastic core layer comprises polypropylene, glass fibers and microsphere lofting agents, in which the film is a polypropylene homopolymer film and the scrim is polyester nonwoven scrim. In certain examples, the film is directly disposed on the first surface of the core layer without any intervening layer or material and the scrim is directly disposed on the second surface of the core layer without any intervening layer or material. In some instances, the scrim is disposed as one or more strips on the second surface of the core layer. In other embodiments, the composition further comprises an additional core layer coupled to the core layer, the additional core layer comprising a web of open celled structures defined by random crossing over of reinforcing fibers held together by a thermoplastic polymer. In some examples, the additional core layer further comprises a lofting agent effective to increase a thickness of the additional core layer. In other embodiments, the additional core layer comprises a lower weight percentage of thermoplastic material than an amount of thermoplastic material present in the core layer. In certain instances, the film is configured to withstand more impacts as a thickness of the core layer is decreased.

In another aspect, an underbody shield composition comprising a thermoplastic core layer comprising a web of open celled structures defined by random crossing over of reinforcing fibers held together by a thermoplastic polymer, the thermoplastic core layer further comprising a lofting agent effective to increase a thickness of the core layer upon exposure to heat to provide a post lofted core layer, a homopolymer polyolefin film or a copolymer polyolefin film disposed on a first surface of the core layer, a scrim disposed on a second surface of the core layer, in which the post lofted core layer, film and scrim together provide an underbody shield article that can withstand at least 50 individual impacts according to a SAE J400 protocol without damage to the film is provided.

In certain instances, the composition comprises a decorative layer disposed on the scrim. In other instances, the thermoplastic core layer comprises a void content of greater than 5% and up to about 95%. In some embodiments, the thermoplastic polymer is present at 50 weight percent or more in the core layer. In other embodiments, the film is at least 10 mils thick. In certain examples, the lofting agent is present at 4 percent by weight or more in the core layer. In other examples, the reinforcing fibers are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In some embodiments, the thermoplastic polymer is a polymer resin that is selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof. In other embodiments, the thermoplastic core layer comprises polypropylene, glass fibers and microsphere lofting agents, and in which the film is a polypropylene homopolymer film. In some examples, the film is directly disposed on the first surface of the core layer without any intervening layer or material.

In an additional aspect, a prepreg comprises a first layer comprising a thermoplastic polymer, reinforcing fibers and a lofting agent, the first layer effective to form a layer comprising a web of open cell structures upon curing of the first layer, wherein the web open celled structures is defined by random crossing over of the reinforcing fibers held together by the thermoplastic polymer with the lofting agent trapped in the open cell structures of the web, wherein the lofting agent is effective to increase a thickness of the first layer after exposure to heat to provide a post-lofted first layer, and a film disposed on a first surface of the first layer, in which the post lofted first layer and film together can withstand at least 50 individual impacts according to a SAE J400 protocol without damage to the film.

In some examples, the film is a homopolymer film, e.g., an impact modified homopolymer film. In other examples, the homopolymer is a polyolefin. In some embodiments, the thermoplastic polymer is present at 50 weight percent or more in the first layer. In other embodiments, the film is at least 10 mils thick. In some examples, the lofting agent is present at 4 percent by weight or more in the first layer. In other examples, the reinforcing fibers are selected from the group consisting of glass fibers, carbon fibers, graphite fibers, synthetic organic fibers, inorganic fibers, natural fibers, mineral fibers, metal fibers, metalized inorganic fibers, metalized synthetic fibers, ceramic fibers, and combinations thereof. In some embodiments, the thermoplastic polymer is a polymer resin that is selected from the group consisting of a polyolefin resin, a thermoplastic polyolefin blend resin, a polyvinyl polymer resin, a butadiene polymer resin, an acrylic polymer resin, a polyamide resin, a polyester resin, a polycarbonate resin, a polyestercarbonate resin, a polystyrene resin, an acrylonitrylstyrene polymer resin, an acrylonitrile-butylacrylate-styrene polymer resin, a polyether imide resin, a polyphenylene ether resin, a polyphenylene oxide resin, a polyphenylenesulphide resin, a polyether resin, a polyetherketone resin, a polyacetal resin, a polyurethane resin, a polybenzimidazole resin, and copolymers and mixtures thereof. In other embodiments, the first layer comprises polypropylene, glass fibers and microsphere lofting agents, and in which the film is a polypropylene homopolymer film. In further examples, the film is directly disposed on the first surface of the first layer without any intervening layer or material. In some instances, the prepreg comprises a scrim disposed on a second surface of the first layer opposite the first surface of the first layer. In certain examples, the scrim comprises glass fibers, aramid fibers, graphite fibers, carbon fibers, inorganic mineral fibers, metal fibers, metalized synthetic fibers, and metalized inorganic fibers. In other examples, the prepreg comprises an additional skin layer disposed on the scrim. In some embodiments, the first layer comprises polypropylene, glass fibers and microsphere lofting agents, in which the film is a polypropylene homopolymer film and the scrim is polyester non-woven scrim. In other examples, the film is directly disposed on the first surface of the first layer without any intervening layer or material and the scrim is directly disposed on the second surface of the first layer without any intervening layer or material. In some examples, the scrim is disposed as one or more strips on the second surface of the first layer. In certain instances, the prepreg comprises an additional layer coupled to the first layer, the additional layer comprising a web of open celled structures defined by random crossing over of reinforcing fibers held together by a thermoplastic polymer. In other embodiments, the additional layer further comprises a lofting agent effective to increase a thickness of the additional layer. In some examples, the additional layer comprises a lower weight percentage of thermoplastic material than an amount of thermoplastic material present in the first layer. In some examples, the film is configured to withstand more impacts as a thickness of the first layer is decreased.

In another aspect, a underbody shield comprises a thermoplastic core layer comprising a web of open celled structures defined by random crossing over of reinforcing fibers held together by a thermoplastic polymer, the thermoplastic core layer further comprising a lofting agent effective to increase a thickness of the core layer upon exposure to heat to provide a post lofted core layer, a film disposed on a first surface of the core layer, in which the post lofted core layer and film together provide the underbody shield that can withstand at least 50 individual impacts according to a SAE J400 protocol without damage to the film, in which the underbody shield comprises one or more attachment areas to couple to an underside of a vehicle.

In certain examples, the underbody shield is shaped to reduce a coefficient of drag on a vehicle when the underbody shield is coupled to the vehicle. In other examples, the film is a homopolymer polyolefin film. In some examples, the thermoplastic polymer is present at 50 weight percent or more in the core layer. In certain examples, the film is at least 10 mils thick. In other examples, the lofting agent is present at 4 percent by weight or more in the core layer. In some embodiments, the thermoplastic core layer comprises polypropylene, glass fibers and microsphere lofting agents, and in which the film is a polypropylene homopolymer film. In other embodiments, the film is directly disposed on the first surface of the core layer without any intervening layer or material. In certain examples, the underbody shield further comprises a scrim disposed on a second surface of the core layer opposite the first surface of the core layer. In other examples, the thermoplastic core layer comprises polypropylene, glass fibers and microsphere lofting agents, in which the film is a polypropylene homopolymer film and the scrim is polyester non-woven scrim. In some embodiments, a method of forming a composite prepreg comprises combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a web comprising the thermoplastic polymer, the reinforcing fibers and the lofting agent, heating the web above a softening temperature of the thermoplastic polymer of the web, and disposing a film on a first surface of the web to provide a composite prepreg that can withstand at least 50 individual impacts according to a SAE J400 protocol without damage to the disposed film.

In some examples, the method comprises compressing the composite prepreg to a predetermined thickness to form a composite article. In other examples, the method comprises lofting the composite article to increase the thickness of the composite article. In further examples, the method comprises disposing a scrim on a second surface of the web. In some examples, the method comprises compressing the composite prepreg to a predetermined thickness to form a composite article. In other examples, the method comprises configuring the thermoplastic polymer as a polypropylene resin, configuring the reinforcing fibers as glass fibers and configuring the lofting agent as microspheres. In certain examples, the method comprises configuring the film as a homopolymer film or a copolymer film. In some embodiments, the method comprises selecting the homopolymer film to be a polyolefin film. In certain instances, the method comprises configuring the film to have a thickness of at least 10 mils. In other embodiments, the method comprises configuring the thermoplastic resin to be present at 50% by weight or more in the aqueous solution.

In another aspect, a method of forming a composite article comprises combining a thermoplastic polymer, reinforcing fibers and a lofting agent in an aqueous solution, mixing the aqueous solution comprising the thermoplastic polymer, reinforcing fibers and lofting agent to disperse the reinforcing fibers and the lofting agent in the thermoplastic polymer to provide an aqueous foam dispersion, disposing the aqueous foam dispersion onto a forming element, removing liquid from the disposed aqueous foam to provide a core layer comprising a web formed from the thermoplastic polymer, the reinforcing fibers and the lofting agent, heating the core layer above a softening temperature of the thermoplastic polymer of the core layer, disposing an impact resistant film on a first surface of the core layer, disposing a scrim on a second surface of the core layer to provide a composite article, and compressing the composite article to a selected thickness, in which the compressed composite article can withstand at least 50 individual impacts according to a SAE J400 protocol without damage to the disposed film.

In certain embodiments, the method comprises lofting the composite article to increase the thickness of the composite article. In other embodiments, the method comprises selecting the scrim as a scrim that comprises glass fibers, aramid fibers, graphite fibers, carbon fibers, inorganic mineral fibers, metal fibers, metalized synthetic fibers, and metalized inorganic fibers. In some instances, the film and the scrim are simultaneously disposed on the core layer. In other instances, the method comprises configuring each of the thermoplastic polymer and the lofting agent as particles with about the same average particle diameter. In certain examples, the method comprises configuring the thermoplastic polymer as a polypropylene resin, configuring the reinforcing fibers as glass fibers and configuring the lofting agent as microspheres. In additional examples, the method comprises configuring the film as a homopolymer film or a copolymer film. In some embodiments, the method comprises selecting the homopolymer film to be a polyolefin film. In some examples, the method comprises configuring the film to have a thickness of at least 10 mils. In certain examples, the method comprises configuring the thermoplastic resin to be present at 50% by weight or more in the aqueous solution.

In another aspect, a method of reducing drag on a vehicle comprises coupling an underbody shield to the vehicle, the underbody shield comprising a thermoplastic core layer comprising a web of open celled structures defined by random crossing over of reinforcing fibers held together by a thermoplastic polymer, the thermoplastic core layer further comprising a lofting agent effective to increase a thickness of the core layer upon exposure to heat to provide a post lofted core layer, and a film disposed on a first surface of the core layer, in which the underbody shield can withstand at least 50 individual impacts according to a SAE J400 protocol without damage to the film of the underbody shield.

In certain examples, the method comprises providing instructions for molding the underbody shield. In other examples, the method comprises providing instructions for lofting the core layer of the underbody shield. In some instances, the method comprises providing at least one fastener configured to couple the underbody shield to the automotive vehicle. In some embodiments, the method comprises instructions for attaching the underbody shield to the automotive vehicle.

In an additional aspect, a method of reducing drag on a vehicle comprises coupling an underbody shield to the vehicle, the underbody shield comprising a thermoplastic core layer comprising a web of open celled structures defined by random crossing over of reinforcing fibers held together by a thermoplastic polymer, the thermoplastic core layer further comprising a lofting agent effective to increase a thickness of the core layer upon exposure to heat to provide a post lofted core layer, a film disposed on a first surface of the core layer and a scrim disposed on a second surface of the core layer, in which the underbody shield can withstand at least 50 individual impacts according to a SAE J400 protocol without damage to the film of the underbody shield.

In some embodiments, the method comprises providing instructions for curing the prepreg to form an underbody shield. In other embodiments, the method comprises providing instructions for molding the prepreg to form an underbody shield. In some instances, the method comprises providing instructions for crosslinking the adhesive layer of the prepreg. In certain examples, the method comprises providing instructions for lofting the core layer.

In another aspect, a method of reducing drag on a vehicle comprises providing an underbody shield comprising a thermoplastic core layer comprising a web of open celled structures defined by random crossing over of reinforcing fibers held together by a thermoplastic polymer, the thermoplastic core layer further comprising a lofting agent effective to increase a thickness of the core layer upon exposure to heat to provide a post lofted core layer, and a film disposed on a first surface of the core layer, in which the underbody shield can withstand at least 50 individual impacts according to a SAE J400 protocol without damage to the film of the underbody shield.

In certain examples, the method comprises providing instructions for molding the underbody shield. In other examples, the method comprises providing instructions for lofting the core layer of the underbody shield. In some embodiments, the method comprises providing at least one fastener configured to couple the underbody shield to the automotive vehicle. In some instances, the method comprises providing instructions for attaching the underbody shield to the automotive vehicle.

In an additional aspect, a method of reducing drag on a vehicle comprises providing an underbody shield comprising a thermoplastic core layer comprising a web of open celled structures defined by random crossing over of reinforcing fibers held together by a thermoplastic polymer, the thermoplastic core layer further comprising a lofting agent effective to increase a thickness of the core layer upon exposure to heat to provide a post lofted core layer, a film disposed on a first surface of the core layer and a scrim disposed on a second surface of the core layer, in which the underbody shield can withstand at least 50 individual impacts according to a SAE J400 protocol without damage to the film of the underbody shield.

In some examples, the method comprises providing instructions for curing the prepreg to form an underbody shield. In other examples, the method comprises providing instructions for molding the prepreg to form an underbody shield. In some instances, the method comprises providing instructions for crosslinking the adhesive layer of the prepreg. In certain examples, the method comprises providing instructions for lofting the core layer.

In another aspect, a molded composite comprises a fiber reinforced thermoplastic polymer core, and a film disposed on a surface of the fiber reinforced thermoplastic polymer core, in which the molded composite can withstand at least 50 individual impacts according to a SAE J400 protocol without damage to the film of the underbody shield.

In some instances, the fiber reinforced thermoplastic polymer core comprises a web of open celled structures defined by random crossing over of reinforcing fibers held together by a thermoplastic polymer. In other instances, the reinforcing fibers comprise glass fibers. In some examples, the film comprises a thickness of at least 10 mils. In some embodiments, the thermoplastic polymer is present at 50% by weight or more and the polymer core further comprises a lofting agent.

In an additional aspect, a molded composite comprises a fiber reinforced thermoplastic polymer core, a film disposed on a first surface of the fiber reinforced thermoplastic polymer core, and a scrim disposed on a second surface of the fiber reinforced thermoplastic polymer core, in which the molded composite can withstand at least 50 individual impacts according to a SAE J400 protocol without damage to the film of the underbody shield.

In some examples, the fiber reinforced thermoplastic polymer core comprises a web of open celled structures defined by random crossing over of reinforcing fibers held together by a thermoplastic polymer. In other examples, the reinforcing fibers comprise glass fibers. In some examples, the film comprises a thickness of at least 10 mils. In certain examples, the thermoplastic polymer is present at 50% by weight or more and the polymer core further comprises a lofting agent.

Additional features, aspect, examples, configurations and embodiments are described in more detail below.

BRIEF DESCRIPTION OF THE FIGURES

Certain embodiments are described with reference to the accompanying figures in which.

Figure 1:
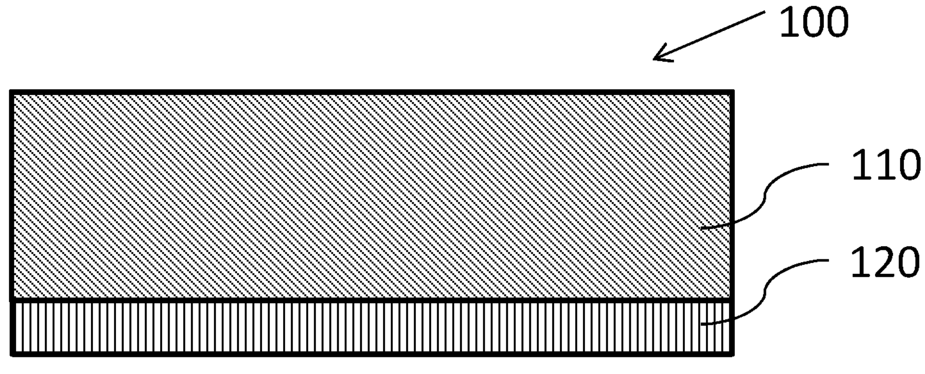
FIG. 1 is an illustration of a core layer coupled to a skin layer, in accordance with certain examples.

It will be recognized by the person of ordinary skill in the art, given the benefit of this disclosure, that certain dimensions or features in the figures may have been enlarged, distorted or shown in an otherwise unconventional or non-proportional manner to provide a more user friendly version of the figures. No particular thickness, width or length is intended by the depictions in the figures, and relative sizes of the figure components are not intended to limit the sizes of any of the components in the figures. Where dimensions or values are specified in the description below, the dimensions or values are provided for illustrative purposes only. In addition, no particular material or arrangement is intended to be required by virtue of shading of certain portions of the figures, and even though different components in the figures may include shading for purposes of distinction, the different components can include the same or similar materials, if desired.

DETAILED DESCRIPTION

Certain embodiments are described below with reference to singular and plural terms in order to provide a more user friendly description of the technology disclosed herein. These terms are used for convenience purposes only and are not intended to limit the prepregs, cores, articles, composites, underbody shields and other subject matter as including or excluding certain features unless otherwise noted as being present in a particular embodiment described herein.

In certain instances, the materials described herein are typically used together to provide an underbody shield which can be coupled to the underside of a vehicle. While some illustrations below refer to coupling of an underbody shield to a passenger automobile, the underbody shields can also be used in commercial vehicles, recreational vehicles, all-terrain vehicles and in other vehicles comprising a gas engine, hybrid engine, electric engine, fuel cell as an engine and the like. Further, the underbody shields can be used in other areas of the engine compartment, e.g., as an engine cover or positioned along the side of an engine block, as wheel well liners, as trunk liners or in other vehicular applications where a light weight, impact resistant composite panel is desired.

Certain configurations described herein refer to impact resistance. Unless otherwise stated, the impact resistance of a particular composite article is tested according to the SAE Standard J400 dated Oct. 23, 2012 (referred to hereafter as "a gravelometer test"), which is similar to ASTM D3170-14 dated Jul. 1, 2014 and entitled "Standard Test Method for Chipping Resistance of Coatings." Even though the aforementioned tests were designed to test impact resistance of surface coatings, they are useful in evaluating the composite articles for impact resistance. For example, the composite article can be tested according to the SAE J400 test and may be considered to pass the test if the number of impact cycles exceeds a desired value, e.g., greater than or equal to 50 impacts by individual stones, gravels or equivalent flying objects, greater than or equal to 100 impacts by individual stones, gravels or equivalent flying objects, greater than or equal to 200 impacts by individual stones, gravels or equivalent flying objects, or greater than or equal to 300 impacts by individual stones, gravels or equivalent flying objects. As discussed in more detail below, by configuring the resin to reinforcing fiber ratio of the core layer and by configuring the thickness and nature of the skin layer, a light weight composite article with high impact resistance can be produced.

Certain configurations are described herein with reference to the article comprising a film. The film may be present (or include) a homopolymer with optionally with one or more additives or a co-polymer optionally with one or more additives. For example, the film may comprise a homopolymer or copolymer comprising one or more polyolefins optionally with one or more additives such as, for example, colorants, impact modifiers, elastomers, etc. Illustrative polymers which may be present in the film or from which the film may be produced include, but are not limited to, one or more of polyethylene, polypropylene, polyamide, polyethylene terephthalate, polycarbonate and polymethyl methacrylate. As noted below, impact modified films and other films can be used to provide an article that can meet at least 50 impacts, 100 impacts or more according to the SAE Standard J400.

In certain examples, the underbody shield compositions described herein may comprise a core layer and a skin layer, e.g., a film or other material which can provide impact resistance to the underbody shield, disposed on the core layer to provide a composite article with an impact resistance of at least 100 individual impacts (according to SAE J400) without any destruction of the skin layer. Referring to FIG. 1, a simplified illustration of an underbody shield board which can be formed into an underbody shield, e.g., using molding, thermoforming, drawing or other forming processes, is shown. The board 100 comprises a core layer 110 and a skin layer 120 disposed on the core layer 110. The skin layer 120 is typically a film with a suitable thickness and properties to provide impact resistance though other materials may instead be used in some configurations. As noted below, however, the core layer 110 can also impart some impact resistance to the composite article even though the impact is not directly incident on the core layer 110. The particular dimensions shown in FIG. 1 have been enlarged for illustration and no particular thickness of one component, relative to the thickness of another component, is intended to be applied. As noted in more detail below, the core layer 110 generally comprises a web open celled structures defined by random crossing over of reinforcing materials, e.g., reinforcing fibers, held together by a thermoplastic polymer. In certain instances, the thermoplastic core layer 110 may also comprise a lofting agent effective to increase a thickness of the core layer upon exposure to heat to provide a post lofted core layer. In some instances, the molding process and the lofting process may be performed together, e.g., by placing the board 100 into a heated mold and applying a sufficient amount of heat to mold the board and loft the core of the board. The particular amounts and types of materials present in the core layer 110 and the skin layer 120 are discussed in more detail below. In some examples, the resin content of the core layer 110 may be increased (compared to a non-impact resistance board), the thickness of the core layer 110 may be decreased and/or the film thickness can be increased to enhance impact resistance of the board 100. For example, the core layer may comprise a higher polymer to reinforcing material ratio (e.g., greater than or equal to 50% by weight thermoplastic polymer in the core layer 110). As noted below, a higher polymer resin amount present in a core layer adjacent to a film can increase the impact resistance of the composite article. Alternatively or in addition to the higher polymer content, the overall thickness of a core layer adjacent to a skin layer 120 may be decreased to provide for enhanced impact strength. Unexpectedly, by decreasing the overall thickness of the core layer 110, impact resistance of the composite article can be increased. In addition, selection of skin layer properties and/or thickness in combination with a decreased thickness core layer may further enhance impact resistance of the article. In some configurations, a core layer 110 may comprise at least 50 weight percent or at least 55 weight percent thermoplastic polymer. The balance of the core layer 110 may comprise reinforcing materials and/or a lofting agent. For example, glass fibers may be present in the core layer 110 up to about 30-45 weight percent, and a lofting agent may be present from about 0 weight percent to about 15 weight percent. In certain examples, the skin layer 120 may be a film (or may comprise a film) with a thickness of 10 mils or more, and the composite article formed using the layers 110, 120 may withstand at least 50 impacts by individual stones, gravels or equivalent flying objects as tested using a gravelometer test. For example, the film 120 may comprise a homopolymer or copolymer such as a polyolefin homopolymer or a polyolefin copolymer (optionally with one or more additives) that provides impact resistance. Illustrative homopolymers for the film 120, include but are not limited to, polyethylene, polypropylene, polyamide, polyethylene terephthalate, polycarbonate and polymethyl methacrylate homopolymers. Where a copolymer is present in the film 120, the copolymers may be produced, for example, using one or more of polyethylene, polypropylene, polyamide, polyethylene terephthalate, polycarbonate and polymethyl methacrylate. The exact thickness of the film can vary and in some instances the film is desirably thick enough to provide at least 50 impacts (to the article comprising the film) under the SAE J400 protocol. The film thickness can vary, for example, based on the thickness and properties of the core layer. In some embodiments, the film 120 is at least about 10 mils thick, more particularly, 12 mils, thick, 14 mils thick, 16 mils thick, 18 mils thick or 20 mils thick or more.

Figure 2:
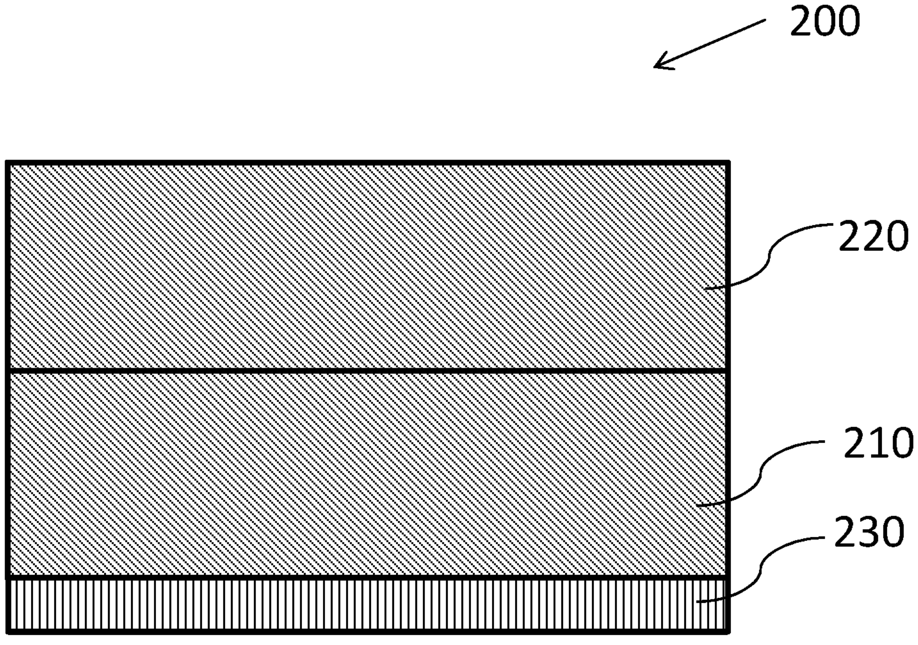
FIG. 2 is an illustration of two core layers and a skin layer, in accordance with certain configurations.

In certain configurations, the core layer can be split into two or more separate core layers if desired. While in some instances, a first and second core layer may comprise the same polymer and/or reinforcing materials, the reinforcing materials and/or polymer of the different core layers can be different if desired. Referring to FIG. 2, an article 200 is shown comprising a first core layer 210 and a second core layer 220. A skin layer 230, e.g., impact resistance film, is disposed on the core layer 210. Where two or more core layers are present, the core layer adjacent to the skin layer 230 may comprise a higher polymer to reinforcing material ratio than other core layers. As noted herein, a higher polymer resin amount present in a core layer adjacent to a skin layer, e.g., a film, can increase the impact resistance of the article. Alternatively or in addition to the higher polymer content, the overall thickness of a core layer adjacent to a skin layer 230 may be decreased to provide for enhanced impact strength. By decreasing the overall thickness of the core layer 210, impact resistance can be increased. In addition, selection of film properties and/or thickness in combination with a decreased thickness core layer may further enhance impact resistance of the article. In some embodiments, the combination of the first core layer 210 and the second core layer 220 may provide an overall desired thickness with the second core layer 220 being thicker than the first core layer 210. In certain configurations, the core layer 210 may comprise at least 50 weight percent may comprise at least 50 weight percent or at least 55 weight percent thermoplastic polymer. The balance of the core layer 210 may comprise reinforcing materials and/or a lofting agent. For example, glass fibers may be present in the core layer 210 up to about 30-45 weight percent, and a lofting agent may be present from about 0 weight percent to about 15 weight percent. The core layer 220 may be configured similar to the core layer 210 or may comprise a lower weight percent thermoplastic polymer, e.g., less than 50 weight percent thermoplastic polymer. The reinforcing material present in the core layers 210, 220 may be the same or may be different, e.g., may both be glass fibers. In some instances, one of the core layers 210, 220 may comprise more lofting agent such that increased thickness can be achieved by lofting one of the core layers 210, 220. For example, in some configurations, the core layer 220 may comprise more lofting agent than the core layer 210, whereas in other configurations, the core layer 210 may comprise more lofting agent than the core layer 220. While not wishing to be bound by any particular theory, by including more lofting agent in the core layer 210, during the lofting process expansion of the core layer 210 can result in higher compression ratio for the molding process which enhances bonding between the two layers 210, 230. The skin layer 230 may be a film (or may comprise a film) with a thickness of 10 mils or more, and the composite article formed using the layers 210-230 may withstand at least 50 impacts by individual stones, gravels or equivalent flying objects as tested using a gravelometer test. In some configurations, the film 230 may comprise a homopolymer or copolymer such as a polyolefin (optionally with one or more additives) that provides impact resistance. Illustrative homopolymers for the film 230, include but are not limited to, polyethylene, polypropylene, polyamide, polyethylene terephthalate, polycarbonate and polymethyl methacrylate homopolymers. Where a copolymer is present in the film 230, the copolymers may be produced, for example, using one or more of polyethylene, polypropylene, polyamide, polyethylene terephthalate, polycarbonate and polymethyl methacrylate. The exact thickness of the film can vary and in some instances the film is desirably thick enough to provide at least 50 impacts (to the article comprising the film) under the SAE J400 protocol. The film thickness can vary, for example, based on the thickness and properties of the core layer. In some embodiments, the film 230 is at least about 10 mils thick, more particularly, 12 mils, thick, 14 mils thick, 16 mils thick, 18 mils thick or 20 mils thick or more.

Figure 3:
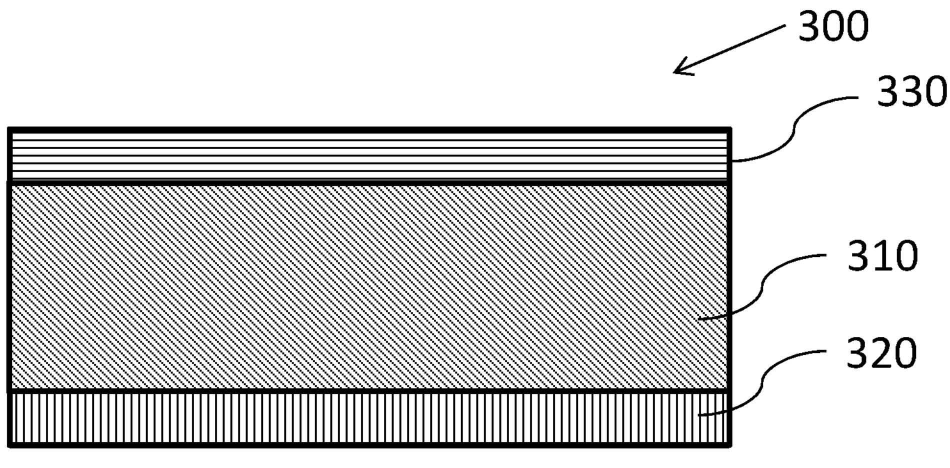
FIG. 3 is an illustration of a composite article including a core layer and two skin layers, in accordance with certain illustrations.

In certain configurations, materials for use as an underbody shield material may include a core layer, a first skin layer and a second skin layer. Referring to FIG. 3, an underbody shield board 300 is shown comprising a core layer 310, a first skin layer 320 disposed on one surface and a second skin layer 330 disposed on another surface. While the first and second skin layers 320, 330 may be the same, in a typical configuration, the skin layer 320 is selected to provide impact resistance and the skin layer 330 is selected for properties other than impact resistance, e.g., to provide acoustics properties, flame retardancy, liquid absorption, aesthetic features, etc. In use of the board 300, the skin layer 320 is typically exposed to the outside environment and may receive impacts from gravel or other debris in its use environment. The particular dimensions shown in FIG. 3 have been enlarged for illustration and no particular thickness of one component, relative to the thickness of another component, is intended to be applied. For example, the skin layers 320, 330 may have the same or a different thickness. The core layer 310 generally comprises a web open celled structures defined by random crossing over of reinforcing materials, e.g., reinforcing fibers, held together by a thermoplastic polymer. In certain instances, the thermoplastic core layer 310 may also comprise a lofting agent effective to increase a thickness of the core layer 310 upon exposure to heat to provide a post lofted core layer. In some instances, the molding process and the lofting process may be performed together, e.g., by placing the board 300 into a heated mold and applying a sufficient amount of heat to mold the board and loft the core of the board. In some examples, the resin content of the core layer 310 may be increased (compared to a non-impact resistance board), the thickness of the core layer 310 may be decreased and/or the film thickness of the layer 320 can be increased to enhance impact resistance of the board 300. For example, the core layer 310 may comprise a higher polymer to reinforcing material ratio (e.g., greater than or equal to 50% by weight thermoplastic polymer in the core layer 310). As noted below, a higher polymer resin amount present in a core layer 310 adjacent to a skin layer 320 comprising a film can increase the impact resistance of the composite article. Alternatively or in addition to the higher polymer content, the overall thickness of a core layer 310 adjacent to the skin layer 320 may be decreased to provide for enhanced impact strength. In some configurations, by decreasing the overall thickness of the core layer 310, impact resistance of the composite article can be increased. In addition, selection of skin layer properties and/or thickness in combination with a decreased thickness core layer 310 may further enhance impact resistance of the article. In some configurations, a core layer 310 may comprise at least 50 weight percent or at least 55 weight percent thermoplastic polymer. The balance of the core layer 310 may comprise reinforcing materials and/or a lofting agent. For example, glass fibers may be present in the core layer 310 up to about 30-45 weight percent, and a lofting agent may be present from about 0 weight percent to about 15 weight percent. In some instances, the skin layer 320 may be a film (or may comprise a film) with a thickness of 10 mils or more. In certain embodiments, the layer 330 may comprise a scrim. In some examples, a composite article formed using the layers 310, 320 and 330 may withstand at least 50 impacts by individual stones, gravels or equivalent flying objects as tested using a gravelometer test. In some configurations, the film 320 may comprise a homopolymer such as a polyolefin (optionally with one or more additives) that provides impact resistance. Illustrative homopolymers for the film 320, include but are not limited to, polyethylene, polypropylene, polyamide, polyethylene terephthalate, polycarbonate and polymethyl methacrylate homopolymers.

Where a copolymer is present in the film 320, the copolymers may be produced, for example, using one or more of polyethylene, polypropylene, polyamide, polyethylene terephthalate, polycarbonate and polymethyl methacrylate. The exact thickness of the film can vary and in some instances the film is desirably thick enough to provide at least 50 impacts (to the article comprising the film) under the SAE J400 protocol. The film thickness can vary, for example, based on the thickness and properties of the core layer. In some embodiments, the film 320 is at least about 10 mils thick, more particularly, 12 mils, thick, 14 mils thick, 16 mils thick, 18 mils thick or 20 mils thick or more.

In certain embodiments, the components of the boards shown in FIGS. 1-3 may be coupled to each other without the use of any intervening adhesive layer. In many composite article constructions, an adhesive layer is present to enhance bonding between the various components. In certain embodiments of the articles described herein, the components are directly coupled to each other without any intervening adhesive layer or other layers. For example, a skin layer can be disposed directly on a surface of the core layer. The construct may be heated and/or compressed to bond the skin layer directly to the core layer without the use of an adhesive layer. Similarly, where two or more core layers are present, the core layers can be directly coupled to each other without the use of an adhesive layer between them. Where a skin layer is disposed on each surface of a core layer, each of the skin layers may be directly coupled to the core layers without an intervening adhesive layer or one of the skins may be coupled to the core layer using an adhesive layer. For example, a scrim can be coupled to a core layer through an adhesive layer on one surface of the core layer, and an impact resistant film can be coupled to the core layer on an opposite surface without the use of any intervening adhesive layer. As noted in more detail below, the various components may be coupled to each other when the core layer is formed and still in a "soft" or melted state or after the core layer has been formed.

Figure 4:
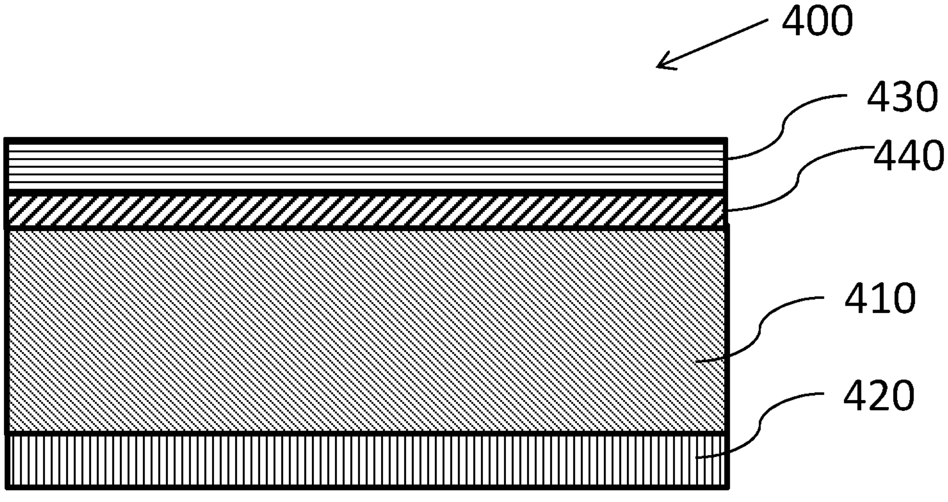
FIG. 4 is an illustration of a composite article including a core layer, two skin layers and a decorative layer, in accordance with certain embodiments.

In certain embodiments and referring to FIG. 4, a board 400 is shown comprising a core layer 410, a first skin layer 420, a second skin layer 430 and an adhesive layer between the core layer 410 and the second skin layer 430. The first and second skin layers 420, 430 may be the same or different. For example, the skin layer 420 can be selected to provide impact resistance, and the skin layer 430 can be selected for properties other than impact resistance, e.g., to provide acoustics properties, flame retardancy, liquid absorption, aesthetic features, etc. In use of the board 400, the skin layer 420 is typically exposed to the outside environment and may receive impacts from gravel or other debris in its use environment. The particular dimensions shown in FIG. 4 have been enlarged for illustration and no particular thickness of one component, relative to the thickness of another component, is intended to be applied. For example, the skin layers 420, 430 may have the same or a different thickness. The core layer 410 generally comprises a web open celled structures defined by random crossing over of reinforcing materials, e.g., reinforcing fibers, held together by a thermoplastic polymer. In certain instances, the thermoplastic core layer 410 may also comprise a lofting agent effective to increase a thickness of the core layer 410 upon exposure to heat to provide a post lofted core layer. In some instances, the molding process and the lofting process may be performed together, e.g., by placing the board 400 into a heated mold and applying a sufficient amount of heat to mold the board and loft the core of the board. In some examples, the resin content of the core layer 410 may be increased (compared to a non-impact resistance board), the thickness of the core layer 410 may be decreased and/or the thickness of the layer 420 can be increased to enhance impact resistance of the board 400. For example, the core layer 410 may comprise a higher polymer to reinforcing material ratio (e.g., greater than or equal to 50% by weight thermoplastic polymer in the core layer 410). As noted below, a higher polymer resin amount present in a core layer 410 adjacent to a skin layer 420 comprising a film can increase the impact resistance of the composite article. Alternatively or in addition to the higher polymer content, the overall thickness of a core layer 410 adjacent to the skin layer 420 may be decreased to provide for enhanced impact strength. In some configurations, by decreasing the overall thickness of the core layer 410, impact resistance of the composite article can be increased. In addition, selection of skin layer properties and/or thickness in combination with a decreased thickness core layer 410 may further enhance impact resistance of the article. In some configurations, a core layer 410 may comprise at least 50 weight percent or at least 55 weight percent thermoplastic polymer. The balance of the core layer 410 may comprise reinforcing materials and/or a lofting agent. For example, glass fibers may be present in the core layer 410 up to about 30-45 weight percent, and a lofting agent may be present from about 0 weight percent to about 15 weight percent. In some instances, the skin layer 420 may be a film (or may comprise a film) with a thickness of 10 mils or more. In certain embodiments, the layer 430 may comprise a scrim. In some configurations, the adhesive layer 440 may comprise a thermoplastic polymer adhesive and/or a thermoset adhesive. In certain embodiments, the adhesive layer 440 may comprise a polyolefin thermoplastic adhesive. In some examples, a composite article formed using the layers 410, 420, 430 and 440 may withstand at least 50 impacts by individual stones, gravels or equivalent flying objects as tested using a gravelometer test. In some configurations, the film 420 may comprise a homopolymer such as a polyolefin (optionally with one or more additives) that provides impact resistance. Illustrative homopolymers for the film 420, include but are not limited to, polyethylene, polypropylene, polyamide, polyethylene terephthalate, polycarbonate and polymethyl methacrylate homopolymers. Where a copolymer is present in the film 420, the copolymers may be produced, for example, using one or more of polyethylene, polypropylene, polyamide, polyethylene terephthalate, polycarbonate and polymethyl methacrylate. The exact thickness of the film can vary and in some instances the film is desirably thick enough to provide at least 50 impacts (to the article comprising the film) under the SAE J400 protocol. The film thickness can vary, for example, based on the thickness and properties of the core layer. In some embodiments, the film 420 is at least about 10 mils thick, more particularly, 12 mils, thick, 14 mils thick, 16 mils thick, 18 mils thick or 20 mils thick or more.

Figure 5:
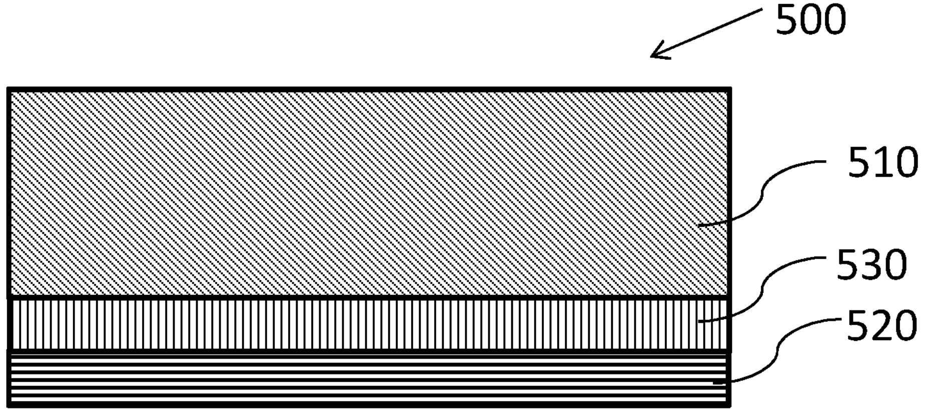
FIG. 5 is an example of a core layer and two skins layers, in accordance with certain configurations.

In certain configurations, one or more areas of the board may comprise reinforcement or strips disposed on a surface of a core layer and/or the skin layers. For example, while the skin layer exposed to impacts typically is a continuous layer across a planar surface of a core layer, the thickness of the skin layer need not be the same at all areas across the board. Certain areas may comprise increased thickness, e.g., areas of the board that are used to fasten an underbody shied to a vehicle may be thicker than other areas. In some instances, the variability in thickness can be achieved by disposing two or more skin layers onto each other. Referring to FIG. 5, a board 500 is shown comprising a core layer 510, and skin layers 520, 530. The skin layer 520 is typically selected to provide impact resistance to the board 500.

The particular dimensions shown in FIG. 5 have been enlarged for illustration and no particular thickness of one component, relative to the thickness of another component, is intended to be applied. For example, the skin layers 520, 530 may have the same or a different thickness. The core layer 510 generally comprises a web open celled structures defined by random crossing over of reinforcing materials, e.g., reinforcing fibers, held together by a thermoplastic polymer. In certain instances, the thermoplastic core layer 510 may also comprise a lofting agent effective to increase a thickness of the core layer 510 upon exposure to heat to provide a post lofted core layer. In some instances, the molding process and the lofting process may be performed together, e.g., by placing the board 500 into a heated mold and applying a sufficient amount of heat to mold the board and loft the core of the board. In some examples, the resin content of the core layer 510 may be increased (compared to a non-impact resistance board), the thickness of the core layer 510 may be decreased and/or the thickness of the layer 520 can be increased to enhance impact resistance of the board 500. For example, the core layer 510 may comprise a higher polymer to reinforcing material ratio (e.g., greater than or equal to 50% by weight thermoplastic polymer in the core layer 510). As noted below, a higher polymer resin amount present in a core layer 510 in combination with a skin layer 520 comprising a film can increase the impact resistance of the composite article. Alternatively or in addition to the higher polymer content, the overall thickness of a core layer 510 may be decreased to provide for enhanced impact strength. In some configurations, by decreasing the overall thickness of the core layer 510, impact resistance of the composite article can be increased. In addition, selection of skin layer properties and/or thickness in combination with a decreased thickness core layer 510 may further enhance impact resistance of the article. In some configurations, a core layer 510 may comprise at least 50 weight percent or at least 55 weight percent thermoplastic polymer. The balance of the core layer 510 may comprise reinforcing materials and/or a lofting agent. For example, glass fibers may be present in the core layer 510 up to about 30-45 weight percent, and a lofting agent may be present from about 0 weight percent to about 15 weight percent. In some instances, the skin layer 520 may be a film (or may comprise a film) with a thickness of 10 mils or more. In certain embodiments, the skin layer 530 may comprise a second film which may or may not be an impact resistance film. In some examples, a composite article formed using the layers 510, 520, and 530 may withstand at least 50 impacts by individual stones, gravels or equivalent flying objects as tested using a gravelometer test. While not shown, the core layer 510 may comprise a scrim disposed on an opposite surface similar to the scrim 330 present in FIG. 3. In certain configurations, the film 520 may comprise a homopolymer such as a polyolefin (optionally with one or more additives) that provides impact resistance. Illustrative homopolymers for the film 520, include but are not limited to, polyethylene, polypropylene, polyamide, polyethylene terephthalate, polycarbonate and polymethyl methacrylate homopolymers. Where a copolymer is present in the film 520, the copolymers may be produced, for example, using one or more of polyethylene, polypropylene, polyamide, polyethylene terephthalate, polycarbonate and polymethyl methacrylate. The exact thickness of the film can vary and in some instances the film is desirably thick enough to provide at least 50 impacts (to the article comprising the film) under the SAE J400 protocol. The film thickness can vary, for example, based on the thickness and properties of the core layer. In some embodiments, the film 520 is at least about 10 mils thick, more particularly, 12 mils, thick, 14 mils thick, 16 mils thick, 18 mils thick or 20 mils thick or more.

Figure 6:
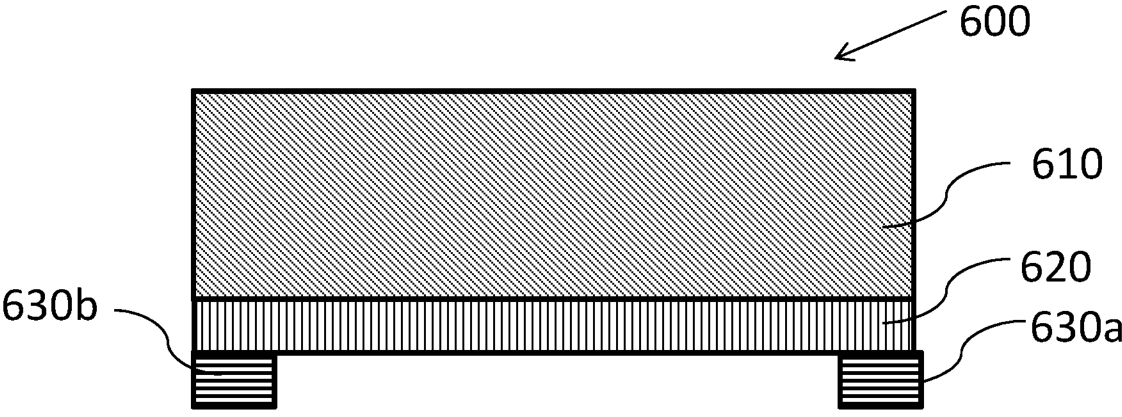
FIG. 6 is an illustration of a core layer, a skin layer, and skin layer strips in accordance with certain examples.

In certain configurations, a second skin layer may only be present at certain areas of an underbody shield. Referring to FIG. 6, a board 600 is shown comprising a core layer 610, a skin layer 620 and skin layer strips 630*a*, 630*b*. While strips 630*a*, 630*b* are shown as being disposed on outer edges of the skin layer 620, they may instead be disposed in other areas as desired. Further, the exact number of strips present may vary from one up to ten or more. As noted herein, it may be desirable to include strips at coupling sites to provide for higher strength areas for regions where the underbody shield couples to a vehicle. The skin strips 630*a*, 630*b* may have the same or a different thickness and may comprise a similar or a different composition. In use, the strips 630*a*, 630*b* may not be positioned in areas that will experience impacts. Instead, the skin layer 620 can be selected to be impact resistant with the skins 630*a*, 630*b* being present in non-impact areas of the board 600. The core layer 610 generally comprises a web open celled structures defined by random crossing over of reinforcing materials, e.g., reinforcing fibers, held together by a thermoplastic polymer. In certain instances, the thermoplastic core layer 610 may also comprise a lofting agent effective to increase a thickness of the core layer 610 upon exposure to heat to provide a post lofted core layer. In some instances, the molding process and the lofting process may be performed together, e.g., by placing the board 600 into a heated mold and applying a sufficient amount of heat to mold the board and loft the core of the board. In some examples, the resin content of the core layer 610 may be increased (compared to a non-impact resistance board), the thickness of the core layer 610 may be decreased and/or the thickness of the layer 620 can be increased to enhance impact resistance of the board 600. For example, the core layer 610 may comprise a higher polymer to reinforcing material ratio (e.g., greater than or equal to 50% by weight thermoplastic polymer in the core layer 610). As noted below, a higher polymer resin amount present in a core layer 610 in combination with a skin layer 620 comprising a film can increase the impact resistance of the composite article. Alternatively or in addition to the higher polymer content, the overall thickness of a core layer 610 may be decreased to provide for enhanced impact strength. In some configurations, by decreasing the overall thickness of the core layer 610, impact resistance of the composite article can be increased. In addition, selection of skin layer properties and/or thickness in combination with a decreased thickness core layer 610 may further enhance impact resistance of the article. In some configurations, a core layer 610 may comprise at least 50 weight percent or at least 55 weight percent thermoplastic polymer. The balance of the core layer 610 may comprise reinforcing materials and/or a lofting agent. For example, glass fibers may be present in the core layer 610 up to about 30-45 weight percent, and a lofting agent may be present from about 0 weight percent to about 15 weight percent. In some instances, the skin layer 620 may be a film (or may comprise a film) with a thickness of 10 mils or more. In certain embodiments, the skin strips 630*a*, 630*b* may also comprise a film, a scrim or other suitable skin layers. In some examples, a composite article formed using the layers 610, 620, and 630*a*, 630*b* may withstand at least 50 impacts by individual stones, gravels or equivalent flying objects as tested using a gravelometer test. While not shown, the core layer 610 may comprise a scrim disposed on an opposite surface similar to the scrim 330 present in FIG. 3. In certain configurations, the film 620 may comprise a homopolymer such as a polyolefin (optionally with one or more additives) that provides impact resistance. Illustrative homopolymers for the film 620, include but are not limited to, polyethylene, polypropylene, polyamide, polyethylene terephthalate, polycarbonate and polymethyl methacrylate homopolymers. Where a copolymer is present in the film 620, the copolymers may be produced, for example, using one or more of polyethylene, polypropylene, polyamide, polyethylene terephthalate, polycarbonate and polymethyl methacrylate. The exact thickness of the film 620 can vary and in some instances the film is desirably thick enough to provide at least 50 impacts (to the article comprising the film) under the SAE J400 protocol. The film thickness can vary, for example, based on the thickness and properties of the core layer. In some embodiments, the film 620 is at least about 10 mils thick, more particularly, 12 mils, thick, 14 mils thick, 16 mils thick, 18 mils thick or 20 mils thick or more.

Figure 7A:
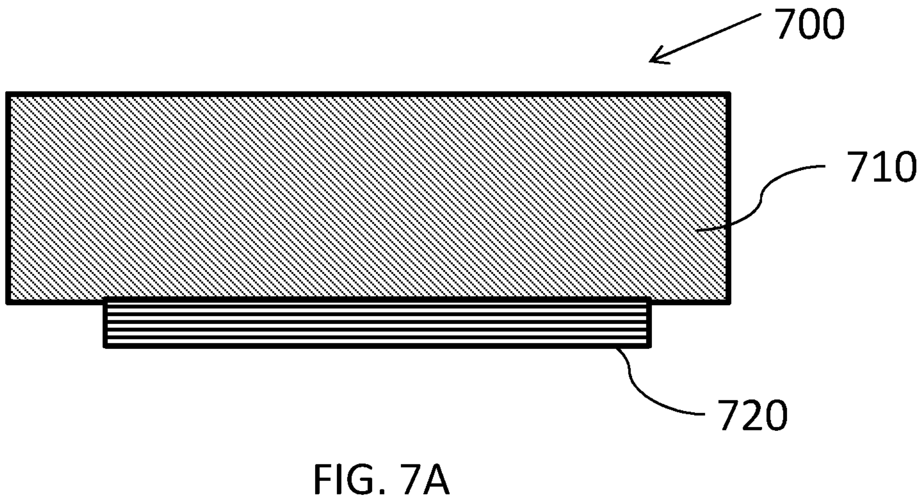
FIGS. 7A and 7B show illustrations of skin layers smaller than a surface of a core layer, in accordance with certain embodiments.
Figure 7B:
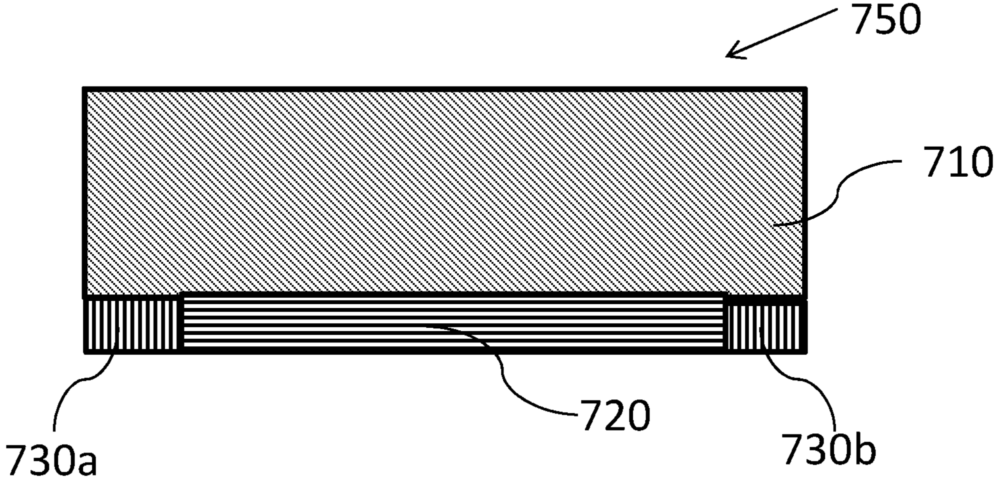

In certain instances, the skin layer need not traverse the entire surface of the core layer. For example and referring to FIG. 7A, a board 700 comprising a core layer 710 and a skin layer 720 disposed on the core layer 710 is shown. The outer edges of the core layer 710 do not comprise any skin layer 720. To reduce overall weight and/or production cost, it may be desirable to dispose an impact resistant skin layer only in areas that are likely to experience significant impacts. Non-impact areas may be filled in with other materials such as films, scrims and the like. For example and referring to FIG. 7B, a board 750 is shown that comprises strips 730*a*, 730*b* adjacent to the skin layer 720. The exact nature and thickness of the strips 730*a*, 730*b* may vary, and the different strips 730*a*, 730*b* may have a similar or different composition and a similar or different thickness or other physical properties. Similar to the other core layers described herein, the core layer 710 generally comprises a web open celled structures defined by random crossing over of reinforcing materials, e.g., reinforcing fibers, held together by a thermoplastic polymer. In certain instances, the thermoplastic core layer 710 may also comprise a lofting agent effective to increase a thickness of the core layer 710 upon exposure to heat to provide a post lofted core layer. In some instances, the molding process and the lofting process may be performed together, e.g., by placing the board 700 or 750 into a heated mold and applying a sufficient amount of heat to mold the board and loft the core of the board. In some examples, the resin content of the core layer 710 may be increased (compared to a non-impact resistance board), the thickness of the core layer 710 may be decreased and/or the thickness of the layer 720 can be increased to enhance impact resistance of the board 700 or 750. For example, the core layer 710 may comprise a higher polymer to reinforcing material ratio (e.g., greater than or equal to 50% by weight thermoplastic polymer in the core layer 710). As noted below, a higher polymer resin amount present in a core layer 710 in combination with a skin layer 720 comprising a film can increase the impact resistance of the composite article. Alternatively or in addition to the higher polymer content, the overall thickness of a core layer 710 may be decreased to provide for enhanced impact strength. In some configurations, by decreasing the overall thickness of the core layer 710, impact resistance of the composite article can be increased. In addition, selection of skin layer properties and/or thickness in combination with a decreased thickness core layer 710 may further enhance impact resistance of the article. In some configurations, a core layer 710 may comprise at least 50 weight percent or at least 55 weight percent thermoplastic polymer. The balance of the core layer 610 may comprise reinforcing materials and/or a lofting agent. For example, glass fibers may be present in the core layer 610 up to about 30-45 weight percent, and a lofting agent may be present from about 0 weight percent to about 15 weight percent. In some instances, the skin layer 720 may be a film (or may comprise a film) with a thickness of 10 mils or more. In certain embodiments, the skin strips 730*a*, 730*b* may also comprise a film, a scrim or other suitable skin layers. In some examples, a composite article formed using the layers 710, 720, and optionally 730*a*, 730*b* may withstand at least 50 impacts by individual stones, gravels or equivalent flying objects as tested using a gravelometer test. While not shown, the core layer 710 may comprise a scrim disposed on an opposite surface similar to the scrim 330 present in FIG. 3, e.g., either of the boards 700 or 750 may comprise a scrim or other layer disposed on a surface of the core layer 710. In certain configurations, the film 720 may comprise a homopolymer such as a polyolefin (optionally with one or more additives) that provides impact resistance. Illustrative homopolymers for the film 720, include but are not limited to, polyethylene, polypropylene, polyamide, polyethylene terephthalate, polycarbonate and polymethyl methacrylate homopolymers. Where a copolymer is present in the film 720, the copolymers may be produced, for example, using one or more of polyethylene, polypropylene, polyamide, polyethylene terephthalate, polycarbonate and polymethyl methacrylate. The exact thickness of the film can vary and in some instances the film is desirably thick enough to provide at least 50 impacts (to the article comprising the film) under the SAE J400 protocol. The film thickness can vary, for example, based on the thickness and properties of the core layer. In some embodiments, the film 720 is at least about 10 mils thick, more particularly, 12 mils, thick, 14 mils thick, 16 mils thick, 18 mils thick or 20 mils thick or more.

The underbody shields described herein are often molded or processed into various shapes to provide a final formed part or article. During processing, it may be desirable to increase the overall thickness of one or more components or layers of the article to be processed. In some configurations described herein, the presence of a lofting agent in a thermoplastic prepreg or a thermoplastic core permits alteration of the overall thickness of the article (or a portion thereof) during heating, molding or other temperature or processing operations. In some instances, the lofting agent can be dispersed, e.g., in a substantially uniform distribution from surface to surface if desired, in void space of a thermoplastic prepreg or core comprising a thermoplastic material and a plurality of fibers. In certain examples, the lofting agent may be present in the prepreg or core but not covalently bonded to the other materials in the prepreg or core. In further examples, the lofting agent may be covalently bonded to one or more groups present in the thermoplastic material or covalently bonded to one or more groups of the plurality of fibers or both. The exact lofting temperature used can vary depending on the other materials present in the prepregs, cores and articles, and in some instances, the lofting temperature may be greater than or equal to the melting point temperature of the thermoplastic material(s) present in the prepregs, cores and articles.

In certain configurations, the articles described herein, e.g., underbody shields, can comprise a prepreg or core layer. While not wishing to be bound by any particular theory, a prepreg is generally not a fully cured or processed version of a core. For example, a partially cured layer comprising a thermoplastic material, a plurality of reinforcing fibers and a lofting agent is generally referred to as a prepreg, whereas a fully cured layer (which may or may not yet be lofted) comprising thermoplastic material, a plurality of reinforcing materials such as fibers and a lofting agent is generally referred to as a core or core layer. As noted herein, even though the core may be considered cured, the core can still be further processed to increase its thickness, to alter its shape or to otherwise provide a formed article or product suitable for an intended use. The description below makes reference to both a prepreg and a core and the materials (and their amounts and properties) used in connection with a prepreg can also be used in a core if desired.

In certain configurations described herein, a suitable amount of a lofting agent is included in the prepregs core and articles to provide for selective lofting of the prepregs, cores and articles. Lofting generally refers to an overall increase in thickness of the prepreg, core or article during or after a processing condition, e.g., application of heat and/or pressure. For example, a lofting agent can be selected such that the prepreg, core or article is substantially insensitive to loft at a first temperature and/or first heating conditions and then is sensitive to loft at a second temperature and/or second heating conditions. In certain automotive applications, the lofting agent can be selected to not substantially loft at 180-190 or 190-200 deg. Celsius and to loft at 210 or 220 deg. Celsius. While not wishing to be bound by any particular theory, the first and second temperatures can vary depending on the thermoplastic material present in the prepreg, core or article. In certain instances, the lofting agent is selected such that substantially no loft occurs until the loft temperature is about 20 deg. Celsius or more higher than the melting point of the thermoplastic material in the prepreg or core layer. In other instances, the lofting agent is selected such that substantially no loft occurs until the loft temperature is about 40 deg. Celsius or more higher than the melting point of the thermoplastic material in the core layer. In further instances, the lofting agent (and/or the lofting conditions) is selected such that substantially no loft occurs until the loft temperature is about 60 deg. Celsius or more higher than the melting point of the thermoplastic material of the core layer. In some instances, the lofting agent is selected such that substantially no loft occurs until the loft temperature is about 80 deg. Celsius or more higher than the melting point of the thermoplastic material in the core layer.

In certain examples, the lofting agent of the prepregs and cores described herein may comprise one or more liquid hydrocarbon-polymer shell materials. The exact type of lofting agent used in the core can depend on numerous factors including, for example, the desired lofting temperature, the desired basis weight, desired processing conditions and other factors. Illustrative commercially available lofting agents that can be present in a prepreg or core are commercially available from Kureha Corp. (Japan) and include, for example, H1100 liquid hydrocarbon core-polymer microspheres. The lofting agent can be present in many forms including fiber form, particle form, microsphere form or other forms. In some instances, the lofting agent can be present in microsphere form and may comprise an average particle size of at least 40 microns, for example, or may comprise an average particle size that is substantially similar to the average particle size of thermoplastic material in the core. In some examples, the lofting agent may be present from about 2 weight percent to about 20 weight percent, though depending on the desired degree of loft, more or less lofting agent can be used in the prepreg or core. While not wishing to be bound by any particular theory, liquid hydrocarbon-polymer shell materials can provide some softness or flexural properties to the core to permit the core to flex and/or absorb some of the impact energy received by the skin layer. This energy absorption can further enhance the impact resistance of the underbody shield materials.

In certain configurations, a porous prepreg comprising one or more thermoplastic materials and a plurality of reinforcing materials, e.g., reinforcing fibers, that together have an open cell structure, e.g., void space, can be produced. In some configurations, a lofting agent can be loaded into the void space in a manner where the lofting agent generally does not covalently bond with the thermoplastic materials and/or the fibers. For example, the thermoplastic materials and/or the fibers can be selected so that they are generally inert or non-reactive with the lofting agent. Even though the lofting agent may not covalently bond to the thermoplastic material and/or the fibers, there can be covalent bonding present in or within the lofting agent itself. In other instances, it may be desirable to covalently bond the lofting agent to the thermoplastic materials, the fibers or both to provide some covalently bonded lofting agent in the prepreg. Even where bonded lofting agent is present, the lofting agent desirably can still increase their occupied volume under suitable conditions such as, for example, convection heating to permit lofting of the prepreg. In some instances, both covalently bonded lofting agent and non-covalently bonded lofting agent materials may also be present in the prepreg. While some configurations of the prepregs may comprise lofting agent where about 100% of the lofting agent materials are non-covalently bonded, weak interactions such as van der Waals' interactions or electrostatic interactions can take place between the lofting agent and the other components of the prepreg.

Figures 8A, 8B, 8C, 8D:
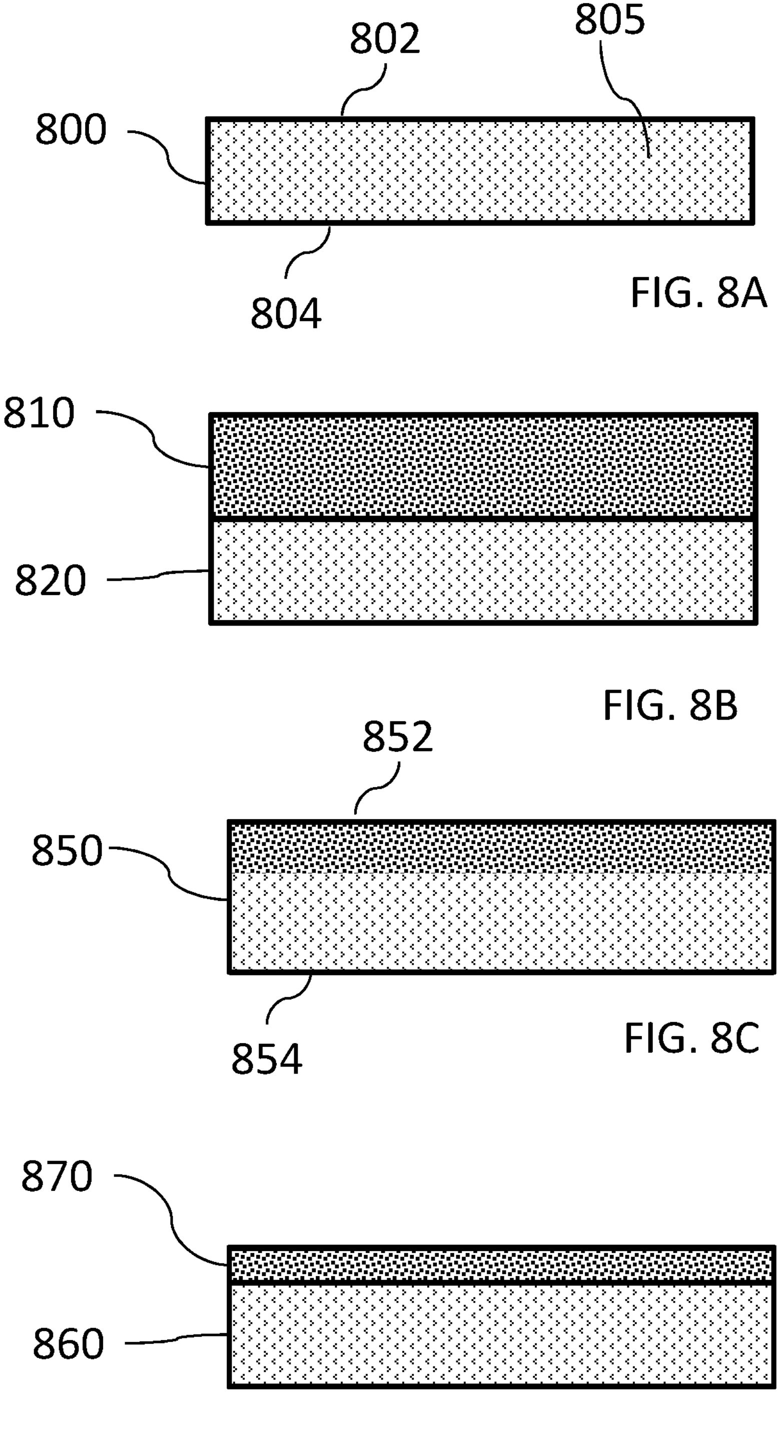
FIGS. 8A-8D show various configurations of a prepreg, in accordance with certain configurations.

In certain examples and referring to FIG. 8A, a prepreg 800 is shown that comprises a thermoplastic material and a plurality of reinforcing fibers. The prepreg 800 also comprises a lofting agent (shown for illustration purposes as dots 805) dispersed through the prepreg 800. In some instances, the lofting agent dispersion can be substantially homogeneous or substantially uniform from a first surface 802 to a second surface 804 of the prepreg 800. As described in more detail herein, to achieve such substantially homogeneous or substantially uniform distribution of lofting agent in the prepreg 800, the components of the prepreg 800 can be mixed together to form a substantially uniform dispersion. Mixing can be performed until the dispersion comprises a substantially homogeneous or substantially uniform mixture of the lofting agent, the thermoplastic materials and the fibers in the dispersion. The prepreg 800 may then be formed as described herein, e.g., by disposing the dispersion on a wire screen using a suitable laying process. In other configurations, it may be desirable to provide a gradient distribution of lofting agent from the surface 802 to the surface 804 such that more lofting agent materials are present toward one of the surfaces 802, 804 than the other surface. In some embodiments, a substantially uniform distribution of lofting agent is present in a prepreg 800 and then additional lofting agent is added to one side of the prepreg 800 to provide a gradient distribution. Such additional lofting agent can be added directly to the prepreg 800, e.g., by spraying or coating a solution comprising the lofting agent, or can be added by coupling a skin, additional prepreg or other component comprising lofting agent to the prepreg 800. For example and referring to FIG. 8B, a first prepreg 810 and a second prepreg 820 disposed on the first prepreg 810 is shown. Each of the first prepreg 810 and the second prepreg 820 comprises a substantially uniform distribution of lofting agent, but the amount of lofting agent in the prepregs 810, 820 is different. If desired, however, only one of the prepregs 810, 820 may comprise a lofting agent and the other prepreg may not comprise a lofting agent or may comprise a different lofting agent. The thermoplastic materials of the prepregs 810, 820 can be melted to provide a single prepreg 850 (FIG. 8C). The result of melting of the prepregs 810, 820 together is a gradient distribution of lofting agent in the prepreg 850 with increased amounts of lofting agent adjacent to a surface 852 as compared to the amount present adjacent to a surface 854. The exact overall thickness of the prepreg 850 may vary depending on the conditions used and no particular thickness is intended to be implied in FIG. 8B.

In other configurations, a distribution of lofting agent in a prepreg can be provided by coupling a skin or other material comprising lofting agent to the prepreg. Referring to FIG. 8C, a skin 870 comprising lofting agent is shown as being disposed on a prepreg 860 comprising a thermoplastic material, reinforcing fibers and lofting agent. While not required, the skin 870 is typically present at a much lower thickness than a pre-lofted thickness of the prepreg 860. In addition, a discernible interface is typically present between the skin 870 and the prepreg 860, whereas coupling of two prepregs to each other, as described in connection with FIG. 8B, generally does not result in any discernible interface in the finally coupled prepreg 850. In other instances, the skin 870 can be melted into the prepreg 860 to couple the skin 870 and the prepreg 860 to leave a coupled skin/prepreg composite material without any substantial interface. If desired and as described in more detail below, an additional skin, which may or may not comprise lofting agent, can also be coupled to the prepreg on an opposite side from the skin 870.

In certain configurations, the thermoplastic material of the prepreg may be present in fiber form, particle form, resin form or other suitable forms. In some instances, the thermoplastic material used in the prepreg can be present in particle form and have an average particle size that is substantially the same as the average particle size of the lofting agent. While not wishing to be bound by any particular scientific theory, by matching the particles sizes of the thermoplastic material and the lofting agent, enhanced processing of the prepregs including, for example, increased retention of the lofting agent in the prepreg can be achieved. In some instances, the average particle size of the lofting agent and the average particle size of the thermoplastic material can vary by about 5% to about 10% and enhanced processing can still be achieved. In certain configurations, the average particle size of each of the thermoplastic material and the lofting agent in the prepreg can differ by about 50 microns to about 120 microns. In some configurations, the average particle size of the lofting agent is at least 50% of the average particle size of the thermoplastic material particles to provide for enhanced processing. In other instances, lofting agent with an average particle size about the same as the average particle size of the thermoplastic material can be present along with lofting agent of an average particle size that is different than the average particle size of the thermoplastic material. Even though the average particle size of the lofting agent may differ, the chemical composition of the lofting agent can be the same or can be different. In yet other configurations, two or more thermoplastic materials with different average particle sizes can be present. If desired, two lofting agents with average particle sizes that are substantially the same as the average particle sizes of the thermoplastic materials can be present. The two lofting agents may be chemically the same or may be chemically distinct. Similarly, the thermoplastic materials can be chemically the same (but have a different average particle size) or can be chemically distinct.

In certain embodiments, the prepreg or core 700 generally comprises a substantial amount of open cell structure such that void space is present in the prepreg. For example, the prepreg or core layer may comprise a void content or porosity of 0-30%, 10-40%, 20-50%, 30-60%, 40-70%, 50-80%, 60-90%, 0-40%,0-50%,0-60%,0-70%,0-80%,0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the prepreg comprises a porosity or void content of greater than 0%, e.g., is not fully consolidated, up to about 95%. Unless otherwise stated, the reference to the prepreg comprising a certain void content or porosity is based on the total volume of the prepreg and not necessarily the total volume of the prepreg plus any other materials or layers coupled to the prepreg.

In certain embodiments, the high porosity present in the prepreg or core permits trapping of lofting agent within the pores of the prepreg. For example, lofting agent can reside in the void space in a non-covalently bonded manner. Application of heat or other perturbations can act to increase the volume of the non-covalently bonded lofting agent which in turn increases the overall thickness of the prepreg or core, e.g., the prepreg or core thickness increases as the size of the lofting agent increases and/or additional air becomes trapped in the prepreg. For example, the lofting agent can be operative as a heat-sensitive agent such that application of a suitable stimulus, e.g., radiant heat, functions to increase the overall thickness of the prepreg. In some instances, the lofting agent can be configured as a binary lofting agent which can expand from no loft to full loft after application of a stimulus such as heat. In additional configurations, the lofting agent can be a linear lofting agent whose size increases substantially linearly with increasing temperature until the lofting agent reaches full loft. In other instances, the lofting agent can be a step-wise lofting agent, e.g., a step-wise lofting agent in the form of microspheres. As used herein, step-wise lofting or a step-wise lofting agent refers to a lofting agent whose thickness increases with temperature, then plateaus, then increases again with increasing temperature. The step-wise increase in volume provides for enhanced control of overall prepreg thickness and reduces the likelihood of over-loft. A desired thickness using a prepreg comprising a lofting agent can be achieved by selecting a suitable processing temperature. If the thickness is not sufficient, in many instances, a higher temperature can then be applied to increase overall thickness to a desired thickness.

In certain embodiments, the thermoplastic material of the prepregs or cores described herein may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene)

compounds commercially known as PARMAX®, high heat polycarbonate such as Bayer's APEC® PC, high temperature nylon, and silicones, as well as alloys and blends of these materials with each other or other polymeric materials. The thermoplastic material used to form the prepreg can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the prepreg can vary and illustrative amounts range from about 20% by weight to about 90% by weight. As noted herein, to increase the overall impact resistance, it may be desirable to configure the prepreg with a thermoplastic polymer with a weight percent of 50% or more, e.g., 55-80 weight percent, 60-80 weight percent, etc.

In certain examples, the reinforcing materials of the prepregs may take the form of fibers which are dispersed throughout the prepreg. For example, one or more of glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof may be present in the prepreg. In some embodiments, any of the aforementioned fibers can be chemically treated prior to use to provide desired functional groups or to impart other physical properties to the fibers, e.g., may be chemically treated so that they can react with the thermoplastic material, the lofting agent or both. In some instances, the fibers used in the prepreg can first be reacted with the lofting agent to provide a derivatized fiber that is then mixed with the thermoplastic material. Alternatively, the lofting agent can be reacted with the thermoplastic material of the prepreg to provide a derivatized thermoplastic material that is then mixed with the fibers. The fiber content in the prepreg may be from about 20% to about 90% by weight of the prepreg, more particularly from about 30% to about 70%, by weight of the prepreg. Typically, the fiber content of a composite article comprising the prepreg varies between about 20% to about 90% by weight, more particularly about 30% by weight to about 80% by weight, e.g., about 40% to about 70% by weight of the composite. As noted herein, to increase the overall impact resistance of the prepreg, it may be desirable to include less fibers by weight than thermoplastic polymer by weight. For example, in some instances the amount of reinforcing materials or fibers present in the prepreg or core layer may be below 50 weight percent, more particularly below 45 weight percent, e.g., below 40 weight percent or below 30 weight percent. The particular size and/or orientation of the fibers used may depend, at least in part, on the polymer material used and/or the desired properties of the resulting prepreg. Suitable additional types of fibers, fiber sizes and amounts will be readily selected by the person of ordinary skill in the art, given the benefit of this disclosure. In one non-limiting illustration, fibers dispersed within a thermoplastic material and lofting agent to provide a prepreg generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm.

The exact type of lofting agent used in the prepreg can depend on numerous factors including, for example, the desired lofting temperature, the desired degree of loft, etc. In some instances, microsphere lofting agents which can increase their size upon exposure to convection heating may be used. Illustrative commercially available lofting agents are available from Kureha Corp. In some instances, the lofting agent is present in microsphere form and may comprise an average particle size of at least 40 microns, for example. In other instances, a first lofting agent with a first average particle size and a second lofting agent with a second average particle size, different from the first average particle size, may be used.

In some configurations, the prepreg of the underbody shield may be a substantially halogen free or halogen free prepreg to meet the restrictions on hazardous substances requirements for certain applications. In other instances, the prepreg may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalopolycarbonates. In some instances, the thermoplastic material used in the prepregs and cores may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the prepreg), more particularly about 1 weight percent to about 13 weight percent, e.g., about 5 weight percent to about 13 weight percent. If desired, two different halogenated flame retardants may be added to the prepregs. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the prepregs may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the prepreg), more particularly about 1 weight percent to about 13 weight percent, e.g., about 5 weight percent to about 13 weight percent based on the weight of the prepreg. If desired, two different substantially halogen free flame retardants may be added to the prepregs. In certain instances, the prepregs described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the prepreg), more particularly about 1 weight percent to about 15 weight percent, e.g., about 2 weight percent to about 14 weight percent based on the weight of the prepreg. The flame retardant agents used in the prepregs described herein can be added to the mixture comprising the lofting agent, thermoplastic material and fibers (prior to disposal of the mixture on a wire screen or other processing component) or can be added after the prepreg is formed.

In certain configurations, the articles described herein may comprise a porous core. In certain examples, the porous core comprises one or more thermoplastic materials and a plurality of reinforcing materials, e.g., reinforcing fibers, that can be held in place by the cured thermoplastic material in a web or network structure to provide a plurality of open cells, void space or a web in the core. In some instances, lofting agent can be present in the void space of the porous core in a manner where the lofting agent generally does not covalently bond with the thermoplastic materials and/or the fibers. For example, the thermoplastic materials and/or the fibers can be selected so that they are generally inert or non-reactive with the lofting agent. Even though the lofting agent may not covalently bond to the thermoplastic material and/or the fibers, there typically is covalent bonding present in or within the lofting agent itself. In other instances, it may be desirable to covalently bond the lofting agent to the thermoplastic materials, the fibers or both to provide some covalently bonded lofting agent in the core. Even where bonded lofting agent are present in the core, the lofting agent desirably can still increase their occupied volume under suitable conditions such as, for example, convection heating to permit lofting of the core. In some instances, both covalently bonded lofting agent and non-covalently bonded lofting agent may also be present in the core. While some configurations of the core may comprise lofting agent where about 100% of the lofting agent are non-covalently bonded, weak interactions such as van der Waals' interactions or electrostatic interactions can take place between the lofting agent and the other components of the core., e.g., charge-charge interactions or hydrophobic interactions can take place between the various components present in the core.

In certain configurations, a core can comprise lofting agent dispersed throughout the core. In some instances, the lofting agent dispersion can be substantially homogeneous or substantially uniform from a first surface to a second surface of the core. As described in more detail herein, to achieve such substantially homogeneous or substantially uniform distribution of lofting agent in the core, the components of the core can be mixed together to form a dispersion. Mixing can be performed until the dispersion comprises a substantially homogeneous or substantially uniform mixture of the lofting agent, the thermoplastic materials and the fibers in the dispersion. The core may then be formed as described herein, e.g., by disposing the dispersion on a wire screen using a suitable laying process followed by melting, compressing and/or consolidation of the thermoplastic material of the core. In other configurations, it may be desirable to provide a gradient distribution of lofting agent from one surface of the core to the other surface of the core. In some configurations, a substantially uniform distribution of lofting agent is present in a core and then additional lofting agent is added to one side of the core to provide a gradient distribution. Such additional lofting agent can be added directly to the core, e.g., by spraying or coating a solution comprising the lofting agent, or can be added by coupling a skin, additional prepreg or core or other component comprising lofting agent to the core. For example, a first core and a second core disposed on the first core can provide a composite article. Each of the cores may comprise a substantially uniform distribution of lofting agent, but the amount and/or type of lofting agent in the two cores can be different, e.g., the loading rates can be different or the materials themselves may be different. If desired, however, only one of the cores may comprise lofting agent and the other core may not comprise a lofting agent or may comprise a different lofting agent. The thermoplastic materials of the cores can be melted to provide a single combined core including materials from the two cores. The result of melting of the cores is a composite core with a gradient distribution of lofting agent. In other configurations, a distribution of lofting agent in a core can be provided by coupling a skin or other material comprising lofting agent to the core. In other instances, the skin can be melted into the core to couple the skin and the core to leave a coupled skin/core composite material without any substantial interface. If desired and as described in more detail below, an additional skin, which may or may not comprise lofting agent can also be coupled to the core on an opposite side from the first skin.

In certain configurations, the thermoplastic material of the core may be used to provide a core in fiber form, particle form, resin form or other suitable forms. In some examples, the thermoplastic material used in the core can be present in particle form and have an average particle size that is substantially the same as the average particle size of the lofting agent (when present). By matching the particles sizes of the thermoplastic material and the lofting agent, enhanced processing of the cores including, for example, increased retention of the lofting agent in the core, an increase in reserved loft capacity, etc. can be achieved. In some instances, the average particle size of the lofting agent and the average particle size of the thermoplastic material can vary by about 5% to about 10% and enhanced processing can still be achieved. In certain configurations, the average particle size of each of the thermoplastic material and the lofting agent in the core can range from about 50 microns to about 900 microns. In other instances, lofting agent with an average particle size about the same as the average particle size of the thermoplastic material can be present along with lofting agent of an average particle size that is different than the average particle size of the thermoplastic material. Even though the average particle size of the lofting agent may differ, the chemical composition of the lofting agent can be the same or can be different. In yet other configurations, two or more thermoplastic materials with different average particle sizes can be present. If desired, two lofting agent with average particle sizes that are substantially the same as the average particle sizes of the two thermoplastic materials can be present in the core. The two lofting agent may be chemically the same or may be chemically distinct. Similarly, the thermoplastic materials can be chemically the same (but have a different average particle size) or can be chemically distinct.

In certain embodiments, the core generally comprises a substantial amount of open cell structure such that void space is present in the core. For example, the core layer may comprise a void content or porosity of 0-30%, 10-40%, 20-50%, 30-60%, 40-70%, 50-80%, 60-90%, 0-40%,0-50%, 0-60%,0-70%,0-80%,0-90%, 5-30%, 5-40%, 5-50%, 5-60%, 5-70%, 5-80%, 5-90%, 5-95%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. In some instances, the core comprises a porosity or void content of greater than 0%, e.g., is not fully consolidated, up to about 95%. Unless otherwise stated, the reference to the core comprising a certain void content or porosity is based on the total volume of the core and not necessarily the total volume of the core plus any other materials or layers coupled to the core. Compared to a prepreg, the porosity of the core can be the same or can be different. For example, in many instances, a prepreg is formed into a core by passing a prepreg through a set of rollers or by pressing one or both surfaces of the prepreg. In such instances, the porosity of the core may be different than the porosity of the prepreg, e.g., can be lower. In some instances, the porosity of the core is intentionally selected to be less than a comparable prepreg to provide for increased lofting capacity of the core into a final formed article or product.

In certain embodiments, the high porosity present in the core permits trapping of lofting agent within the pores of the core. For example, lofting agent can reside in the void space in a non-covalently bonded manner. Application of heat or other perturbations can act to increase the volume of the non-covalently bonded lofting agent which in turn increases the overall thickness of the core. For example, the lofting agent can be operative as a lofting agent such that application of a suitable stimulus, e.g., convection heat, functions to increase the overall thickness of the core.

In certain embodiments, the thermoplastic material of the cores described herein may comprise, at least in part, one or more polymers including, but not limited to, polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly (1,4 phenylene) compounds commercially known as PARMAX®, high heat polycarbonate such as Bayer's APEC® PC, high temperature nylon, and silicones, as well as alloys and blends of these materials with each other or other polymeric materials. The thermoplastic material used to form the core can be used in powder form, resin form, rosin form, fiber form or other suitable forms. Illustrative thermoplastic materials in various forms are described herein and are also described, for example in U.S. Publication Nos. 20130244528 and US20120065283. The exact amount of thermoplastic material present in the core can vary and illustrative amounts range from about 20% by weight to about 90% by weight. To increase the overall impact resistance, it may be desirable to configure the core with a thermoplastic polymer with a weight percent of 50% or more, e.g., 55-80 weight percent, 60-80 weight percent, etc. In some embodiments, the thermoplastic polymer component of the core is the "major" component of the core in that it is the material present in the highest weight percentage of the core.

In certain examples, the reinforcing materials of the cores may take the form of fibers that can comprise glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated so that they can react with the thermoplastic material, the lofting agent or both. In some instances, the fibers used in the core can first be reacted with the lofting agent to provide a derivatized fiber that is then mixed with the thermoplastic material. Alternatively, the lofting agent may be reacted with the thermoplastic material of the core to provide a derivatized thermoplastic material that is then mixed with the fibers. The fiber content in the core may be from about 20% to about 90% by weight of the core, more particularly from about 30% to about 70%, by weight of the core. The particular size and/or orientation of the fibers used may depend, at least in part, on the polymer material used and/or the desired properties of the resulting core. Suitable additional types of fibers, fiber sizes and amounts will be readily selected by the person of ordinary skill in the art, given the benefit of this disclosure. In one non-limiting illustration, fibers dispersed within a thermoplastic material and lofting agent to provide a core generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm.

In some instances, the core may be a substantially halogen free or halogen free core to meet the restrictions on hazardous substances requirements for certain applications. In other instances, the core may comprise a halogenated flame retardant agent such as, for example, a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the cores may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the core), more particularly about 1 weight percent to about 13 weight percent, e.g., about 5 weight percent to about 13 weight percent. If desired, two different halogenated flame retardants may be added to the core. In other instances, a non-halogenated flame retardant agent such as, for example, a flame retardant agent comprising one or more of N, P, As, Sb, Bi, S, Se, and Te can be added. In some embodiments, the non-halogenated flame retardant may comprise a phosphorated material so the cores may be more environmentally friendly. Where non-halogenated or substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the core), more particularly about 1 weight percent to about 13 weight percent, e.g., about 5 weight percent to about 13 weight percent based on the weight of the cores. If desired, two different substantially halogen free flame retardants may be added to the cores. In certain instances, the prepregs and cores described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the core), more particularly about 1 weight percent to about 15 weight percent, e.g., about 2 weight percent to about 14 weight percent based on the weight of the core. The flame retardant agents used in the cores described herein can be added to the mixture comprising the lofting agent materials, thermoplastic material and fibers (prior to disposal of the mixture on a wire screen or other processing component) or can be added after the prepreg is formed or the core is cured, e.g., by soaking the prepreg or core in the flame retardant agent or spraying flame retardant agent on the prepreg or core.

Figure 9:
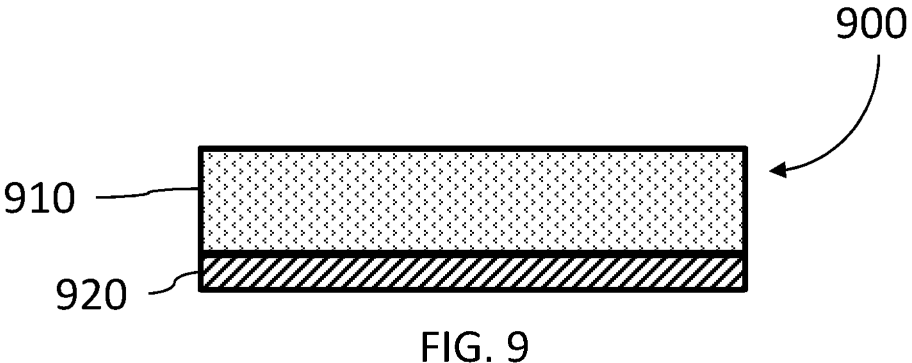
FIG. 9 is an illustration of an article comprising a prepreg or core and a film, in accordance with certain embodiments.

In certain embodiments, as noted herein, the composite articles may comprise a skin material disposed on a surface of the prepreg or core to provide an underbody shield composition that can be processed into an underbody shield. Referring to FIG. 9, an article 900 comprises a prepreg or core 910 that comprises a thermoplastic polymer material, a plurality of reinforcing fibers and lofting agent disposed in the void space of the prepreg or core. The article 900 comprises a first film 920 disposed on the prepreg or core 910. The film comprises suitable properties to increase impact resistance. For example, the film 920 may be comprised of a homopolymer such as a polyolefin (optionally with one or more additives) that provides impact resistance. Illustrative homopolymers for the film 920, include but are not limited to, polyethylene, polypropylene, polyamide, polyethylene terephthalate, polycarbonate and polymethyl methacrylate homopolymers. Where a copolymer is present in the film 920, the copolymers may be produced, for example, using one or more of polyethylene, polypropylene, polyamide, polyethylene terephthalate, polycarbonate and polymethyl methacrylate. The exact thickness of the film can vary and in some instances the film is desirably thick enough to provide at least 50 impacts under the SAE J400 protocol. The film thickness can vary, for example, based on the thickness and properties of the core layer. In some embodiments, the film 920 is at least about 10 mils thick, more particularly, 12 mils, thick, 14 mils thick, 16 mils thick, 18 mils thick or 20 mils thick. The exact weight percentages of thermoplastic polymer in the core 910 can also vary, the thermoplastic polymer is typically present at a larger weight percentage than the reinforcing fibers and the lofting agent, e.g., the thermoplastic polymer may be present at 50-55 weight percent or more in the core 910. In some instances, the thermoplastic polymer of the core 910 may comprise polypropylene, the reinforcing fibers of the core 910 may be glass fibers, the lofting agent of the core may comprise microspheres and the skin layer 920 may be (or may comprise) a polypropylene homopolymer film.

Figure 10:
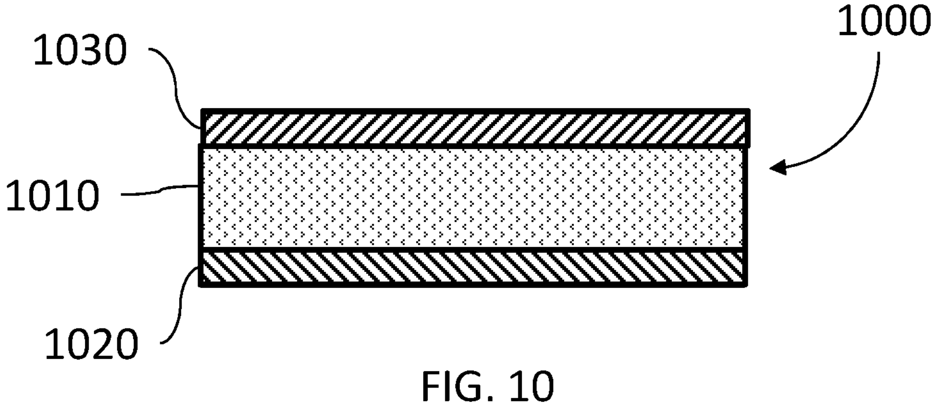
FIG. 10 is an illustration of an article comprising a prepreg or core, a film and a scrim, in accordance with certain embodiments.

In certain configurations, the prepregs and cores described herein can be used to provide an article comprising a skin on each side of the prepreg or core. Referring to FIG. 10, an article 1000 is shown comprising a prepreg or core 1010, an impact resistant film 1020 disposed on a first surface of the prepreg or core 1010 and a scrim 1030 disposed on a second surface of the prepreg or core 1010. The prepreg or core 1010 may comprise any of the materials described herein in connection with prepregs and cores, e.g., a thermoplastic material, reinforcing fibers and a lofting agent dispersed in the prepreg or core 1010. In some instances, a thermoplastic polymer comprises a major component of the prepreg or core 1010, e.g., is present at 50 weight percent or more in the prepreg or core. The film 1020 may be comprised of a homopolymer such as a polyolefin (optionally with one or more additives) that provides impact resistance. Illustrative homopolymers for the film 1020, include but are not limited to, polyethylene, polypropylene, polyamide, polyethylene terephthalate, polycarbonate and polymethyl methacrylate homopolymers. Where a copolymer is present in the film 1020, the copolymers may be produced, for example, using one or more of polyethylene, polypropylene, polyamide, polyethylene terephthalate, polycarbonate and polymethyl methacrylate. The scrim 1030 may be a fiber based scrim and may comprise at least one of glass fibers, aramid fibers, graphite fibers, carbon fibers, inorganic mineral fibers, metal fibers, metalized synthetic fibers, and metalized inorganic fibers. In some configurations of the article 1000, the core 1010 comprises polypropylene, glass fibers and a microsphere lofting agent, the film 1020 is a polypropylene homopolymer film and the scrim is a polyester non-woven.

Figure 11:
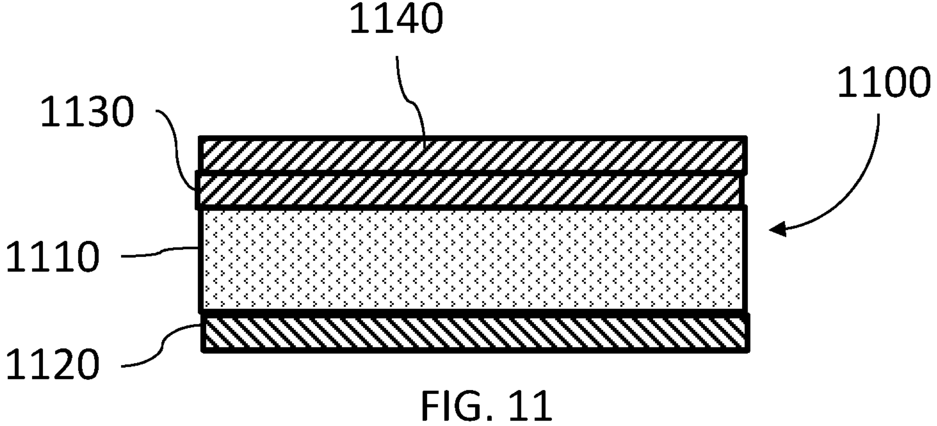
FIG. 11 is an illustration of an article comprising a prepreg or core, a film, a scrim and a decorative layer, in accordance with certain embodiments.

In certain instances, an underbody shield can comprise a prepreg or core, at least one film disposed on the prepreg or core, a scrim disposed on the prepreg or core and a decorative or cover layer disposed on the scrim. Referring to FIG. 11, an article such as an underbody shield 1100 is shown comprising a prepreg or core 1110, a film 1120 disposed on a first surface of the prepreg or core 1110, a scrim 1030 disposed on a second surface of the prepreg or corer 1110 and a decorative layer 1140 disposed on the scrim 1130. The prepreg or core 1110 may comprise any of the materials described herein in connection with prepregs and cores, e.g., a thermoplastic material, reinforcing fibers and a lofting agent dispersed in the prepreg or core 1110. In some embodiments, the core 1110 comprises a thermoplastic polymer material as a major component. The film 1120 may be comprised of a homopolymer such as a polyolefin (optionally with one or more additives) that provides impact resistance. Illustrative homopolymers for the film 1120, include but are not limited to, polyethylene, polypropylene, polyamide, polyethylene terephthalate, polycarbonate and polymethyl methacrylate homopolymers. Where a copolymer is present in the film 1120, the copolymers may be produced, for example, using one or more of polyethylene, polypropylene, polyamide, polyethylene terephthalate, polycarbonate and polymethyl methacrylate. The scrim 1130 may be a fiber based scrim (or other scrims) and may comprise at least one of glass fibers, aramid fibers, graphite fibers, carbon fibers, inorganic mineral fibers, metal fibers, metalized synthetic fibers, and metalized inorganic fibers. In some configurations of the article 1100, the core 1110 comprises polypropylene, glass fibers and a microsphere lofting agent, the film 1120 is a polypropylene homopolymer film, the scrim 1130 is a polyester non-woven and the decorative layer 1140 may be formed, e.g., from a thermoplastic film of polyvinyl chloride, polyolefins, thermoplastic polyesters, thermoplastic elastomers, or the like. The decorative layer 1140 may also be a multi-layered structure that includes a foam core formed from, e.g., polypropylene, polyethylene, polyvinyl chloride, polyurethane, and the like. A fabric may be bonded to the foam core, such as woven fabrics made from natural and synthetic fibers, organic fiber non-woven fabric after needle punching or the like, raised fabric, knitted goods, flocked fabric, or other such materials. The fabric may also be bonded to the foam core with a thermoplastic adhesive, including pressure sensitive adhesives and hot melt adhesives, such as polyamides, modified polyolefins, urethanes and polyolefins. The decorative layer

1140 may also be produced using spunbond, thermal bonded, spun lace, melt-blown, wet-laid, and/or dry-laid processes.

In certain embodiments, while the specific configurations shown in FIGS. 9-11 are described in reference to the various components being present as a single component, the cores, films, scrims, etc. may instead be present as a multi-layer assembly if desired. In some configurations, the film may desirably be present as a single layer to avoid delamination or peeling between film layers. Further, after processing of the various layers in the article, a discernible interface may not be present to distinguish one layer from another.

In some embodiments, the prepregs and cores may include additional materials or additives to impart desired physical or chemical properties. For example, one or more dyes, texturizing agents, colorants, viscosity modifiers, smoke suppressants, synergistic materials, lofting agents, particles, powders, biocidal agents, foams or other materials can be mixed with or added to the prepregs or the cores. In some instances, the prepregs or cores may comprise one or more smoke suppressant compositions in the amount of about 0.2 weight percent to about 10 weight percent. Illustrative smoke suppressant compositions include, but are not limited to, stannates, zinc borates, zinc molybdate, magnesium silicates, calcium zinc molybdate, calcium silicates, calcium hydroxides, and mixtures thereof. If desired, a synergist material can be present to enhance the physical properties of the prepregs or cores. If desired, a synergist material that enhances lofting ability may be present. Illustrative synergist materials include, but are not limited to, sodium trichlorobenzene sulfonate potassium, diphenyl sulfone-3-sulfonate, and mixtures thereof.

In other instances, the prepregs or cores described herein may comprise a thermosetting material in a desired amount, e.g., in a minor amount less than about 50 weight percent based on the total weight of the prepreg or core, to impart desired properties to the core. The thermosetting material may be mixed with the thermoplastic material or may be added as a coating on one or more surfaces of the prepregs or cores.

In certain embodiments, the prepregs or cores described herein can be configured as (or used in) a glass mat thermoplastic composite (GMT) or a light weight reinforced thermoplastic (LWRT). One such LWRT is prepared by HANWHA AZDEL, Inc. and sold under the trademark SUPERLITE® mat. SUPERLITE® mat loaded with lofting agent can provide desirable attributed including, for example, flame retardancy and enhanced processing capabilities. The areal density of such a GMT or LWRT can range from about 400 grams per square meter (gsm) of the GMT or LWRT to about 4000 gsm, although the areal density may be less than 400 gsm or greater than 4000 gsm depending on the specific application needs. In some embodiments, the upper density can be less than about 4000 gsm. In certain instances, the GMT or the LWRT may comprise lofting agent material disposed in void space of the GMT or the LWRT. For example, non-covalently bonded lofting agent can be present in void space of the GMT or the LWRT. In other instances, covalently-bonded lofting agent can be present in void space of the GMT or the LWRT. In yet other configurations, both non-covalently bonded lofting agent and covalently bonded lofting agent can be present in the GMT or the LWRT. In certain configurations where a GMT or LWRT prepreg or core is used in combination with lofting agent, the basis weight of the GMT or LWRT can be reduced to less than 800 gsm, 600 gsm or 400 gsm, for example, while still providing suitable performance properties, e.g., suitable peel strength between the LWRT and any skin disposed thereon. If desired, an additional lofting agent, e.g., microspheres can be present in the GMT or LWRT. In some instances, the basis weight of the LWRT used as a core of the underbody shield may be less than about 1500 gsm, e.g., 1400 gsm, 1350 gsm, 1300 gsm, 1275 gsm, 1250 gsm, 1225 gsm or 1200 gsm, and may comprise polypropylene, glass fibers and microspheres as a lofting agent. Where the basis weight of the LWRT is less than 1500 gsm, the polypropylene component may be present in a major amount, e.g., 50 weight percent or more.

In producing the prepregs and cores described herein, it may be desirable to use a wet-laid process. For example, a liquid or fluid medium comprising dispersed material, e.g., thermoplastic materials, fibers and lofting agent material optionally with any one or more additives described herein (e.g., other lofting agents or flame retardant agents), may be stirred or agitated in the presence of a gas, e.g., air or other gas. The dispersion may then be laid onto a support, e.g., a wire screen or other support material. The stirred dispersion may comprise one or more active agents, e.g., anionic, cationic, or non-ionic such as, for example, those sold under the name ACE liquid by Industrial Soaps Ltd., that sold as TEXOFOR® FN 15 material, by Glover Chemicals Ltd., and those sold as AMINE Fb 19 material by Float-Ore Ltd. These agents can assist in dispersal of air in the liquid dispersion. The components can be added to a mixing tank, flotation cell or other suitable devices in the presence of air to provide the dispersion. While an aqueous dispersion is desirably used, one or more non-aqueous fluids may also be present to assist in dispersion, alter the viscosity of the fluid or otherwise impart a desired physical or chemical property to the dispersion or the prepreg, core or article. In some examples, to impart enhanced impact resistance to the core, the amount of thermoplastic polymer present in the mixture may exceed the amount of reinforcing fibers and/or lofting agent present in the mixture.

In certain instances, after the dispersion has been mixed for a sufficient period, the fluid with the suspended materials can be disposed onto a screen, moving wire or other suitable support structure to provide a web of laid down material. Suction or reduced pressure may be provided to the web to remove any liquid from laid down material to leave behind the thermoplastic material, lofting agent and any other materials that are present, e.g., fibers, additives, etc. The resulting web can be dried, consolidated, pressed, lofted, laminated, sized or otherwise processed further to provide a desired prepreg, core or article. In some instances, an additive or additional lofting agent material can be added to the web prior to drying, consolidation, pressing, lofting, laminating, sizing or other further processing to provide a desired prepreg, core or article. In other instances, the lofting agent may be added to the web subsequent to drying, consolidation, pressing, lofting, laminating, sizing or other further processing to provide a desired prepreg, core or article. While wet laid processes may be used, depending on the nature of the thermoplastic material, the lofting agent material and other materials present, it may be desirable to instead use an air laid process, a dry blend process, a carding and needle process, or other known process that are employed for making non-woven products. In some instances, additional lofting agent material can be sprayed onto the surface of the prepreg or core after the prepreg or core has hardened to some degree by passing the board underneath a plurality of coating jets that are configured to spray the lofting agent material at about a ninety degree angle to the prepreg or core surface.

In some configurations, the prepregs and cores described herein can be produced by combining a thermoplastic material, fibers, and microsphere lofting agent in the presence of a surfactant in an aqueous solution or foam. The combined components can be mixed or agitated for a sufficient time to disperse the various materials and provide a substantially homogeneous aqueous mixture of the materials. The dispersed mixture is then laid down on any suitable support structure, for example, a wire mesh or other mesh or support having a desired porosity. Water can then be evacuated through the wire mesh forming a web. The web is dried and heated above the softening temperature of the thermoplastic powder. The web is then cooled and pressed to a predetermined thickness to produce a composite sheet having a void content of between about 1 percent to about 95 percent. In an alternate embodiment, the aqueous foam also includes a binder material. In some configurations, after the web is heated above the softening temperature of the thermoplastic powder, an adhesive layer comprising a thermoplastic polymer and a thermosetting material can then be disposed on the web.

In certain examples, a prepreg or core in the form of a GMT can be produced. In certain instances, the GMT can be generally prepared using chopped glass fibers, a thermoplastic material, lofting agent and an optional thermoplastic polymer film or films and/or woven or non-woven fabrics made with glass fibers or thermoplastic resin fibers such as, for example, polypropylene (PP), polybutylene terephthalate (PBT), polyethylene terephthalate (PET), polycarbonate (PC), a blend of PC/PBT, or a blend of PC/PET. In some embodiments, a PP, a PBT, a PET, a PC/PET blend or a PC/PBT blend can be used as a resin. To produce the glass mat, a thermoplastic material, reinforcing materials, lofting agent and/or other additives can be added or metered into a dispersing foam contained in an open top mixing tank fitted with an impeller. Without wishing to be bound by any particular theory, the presence of trapped pockets of air of the foam can assist in dispersing the glass fibers, the thermoplastic material and the lofting agent. In some examples, the dispersed mixture of glass and resin can be pumped to a head-box located above a wire section of a paper machine via a distribution manifold. The foam, not the glass fiber, lofting agent or thermoplastic, can then be removed as the dispersed mixture is provided to a moving wire screen using a vacuum, continuously producing a uniform, fibrous wet web. The wet web can be passed through a dryer at a suitable temperature to reduce moisture content and to melt or soften the thermoplastic material. When the hot web exits the dryer, a surface layer such as, for example, a film and/or scrim may be laid onto the web. In certain instances, an impact resistant film may be coupled to the web by pressing the film against the web using rollers or other devices. For example, after the web is formed, a film may be added to an underside of the web and the combined construct can be passed between a set of rollers to couple the film to the web. In other instances, a scrim may be added to the top of the web to couple the scrim to the web. The scrim may be added before, after or simultaneously with the film. For example, a film can be disposed on the web from below and a scrim can be disposed on the web from above. The 3-layered assembly may be passed through a set of nip rollers with selected spacing to press the film and scrim onto the surfaces of the web. For example, the 3-layer assembly may be passed through the nip of a set of heated rollers. If desired, additional layers such as, for example, a non-woven and/or woven fabric layer or skin layer may also be attached to one side or to both sides of the web to facilitate ease of handling the glass fiber-reinforced mat. The composite can then be passed through tension rolls and continuously cut (guillotined) into the desired size for later forming into an end product article. Further information concerning the preparation of such GMT composites, including suitable materials and processing conditions used in forming such composites, are described, for example, in U.S. Pat. Nos. 6,923,494, 4,978,489, 4,944,843, 4,964,935, 4,734,321, 5,053,449, 4,925,615, 5,609,966 and U.S. Patent Application Publication Nos. US 2005/0082881, US2005/0228108, US 2005/0217932, US 2005/0215698, US 2005/0164023, and US 2005/0161865.

In some instances, a prepreg, core or article can be produced by combining a thermoplastic material, reinforcing fibers and lofting agent in a mixture to form an agitated aqueous foam. The agitated aqueous foam can be disposed onto a wire support. Water can be evacuated to form a web or open cell structure. The web can be heated, e.g., using convection heating, above the melting temperature of the thermoplastic material under conditions such that substantially no loft occurs. If desired, pressure can be applied to the web to provide a thermoplastic composite sheet comprising the lofting agent. The sheet can be further processed by selecting suitable heating conditions to provide a desired loft. A skin or cover layer can then be disposed on the adhesive layer. In some instances, heating conditions that are effective to loft the sheet can be applied to increase the overall board thickness. For example, the multi-layer assembly can be placed in a mold and heating conditions can be applied to loft the sheet to press the surfaces of the sheet against the other layers of the assembly while still providing a desired peel strength. In other instances, one or more areas of the multi-layer assembly can be drawn to a desired depth to form structures with a selected geometry and/or dimensions.

In certain instances, a method of producing a composite article comprises combining a thermoplastic material, reinforcing fibers and a lofting agent in a mixture to form an agitated aqueous foam. The foam is disposed onto a wire support, and the water is evacuated to form a web or open cell structure comprising the thermoplastic material, fibers and lofting agent materials. In some instances, the web is then heated to a first temperature above the melting temperature of the thermoplastic material, in which the first temperature is below a loft onset temperature of the lofting agent so substantially no loft occurs. In other instances, the web can be heating using heating conditions that melt the thermoplastic material, e.g., convection heating, but do not substantially loft the lofting agent. If desired, pressure can then be applied to the web, e.g., using nip rollers or other devices, to provide a thermoplastic composite sheet comprising the lofting agent dispersed in the web.

In certain instances, an impact resistant film may be coupled to an LWRT web by pressing the film against the web using rollers or other devices. For example, after the web is formed, a film may be added to an underside of the web and the combined construct can be passed between a set of rollers to couple the film to the web. In other instances, a scrim may be added to the top of the web to couple the scrim to the web. The scrim may be added before, after or simultaneously with the film. For example, a film can be disposed on the web from below and a scrim can be disposed on the web from above. The 3-layered assembly may be passed through a set of nip rollers with selected spacing to press the film and scrim onto the surfaces of the web.

Certain examples are described below to illustrate better some of the novel aspects and configurations described herein.

Example 1

Several examples below refer to testing using a gravelometer test. In the test procedure, sample plaques of 100 mm×300 mm are placed in a holder with the back side supported against a steel plate. Stones were projected at the plaques at 90 degrees or perpendicular to the surface. The stones used were water eroded alluvial road gravel 8 to 16 mm in size. Stones were fed through the air stream with an 8±2 seconds interval at an air pressure of 70 psi. Every 10 cycles the specimen was taken out for observation. Any cracking, blistering, delamination, or erosion though the outer surface indicates failure. The test was continued until any of the above mentioned failure was observed. Two specimens were tested for each sample; the cycles at failure were the average of two specimens. The basis weight of the tested plaques was about 1250 grams per square meter (gsm). The tested plaques included a scrim (0.1-0.2 mm thick), a film (50-500 microns thick) and a polypropylene resin/glass fiber core between them to provide an overall thickness of about 2 mm.

Example 2

The tested LWRT consisted of two primary components: chopped glass fiber and polypropylene (PP) resin. The glass fiber acts as the high modulus reinforcement and the PP resin is the matrix, which holds the reinforcement in place and deforms to distribute the stress to the reinforcement under applied load. By changing the charging speed of the two major components, the glass fiber/PP resin ratio in the final product can be altered. The effect of glass/resin ratio on the gravelometer performance of the LWRT is shown in Table 1.

TABLE 1

| Effect of Glass | Gravelometer Test (cycles) | | Average | Peel Strength |
|---|---|---|---|---|
| Content | Specimen 1 | Specimen 2 | (cycles) | (N/cm) |
| High Resin Content Sample (55 wt % PP resin) | 70 | 75 | 73 | 12.9 |
| Low Resin Content Sample (45 wt % PP resin) | 40 | 40 | 40 | 4.6 |

The gravelometer performance of the LWRT improves with increased resin content (or decreased glass content). The gravelometer failure cycles almost doubled by increasing the PP resin content to 55 weight percent. A couple of factors could be contributing to the increased gravelometer performance with increasing PP resin content. First, the higher resin content increases the "softness" of the core. This will enable larger elastic deformation of the core under impact and helps absorb the impact energy. Secondly, the higher resin content can improve the bonding strength between the skin film and the composite core. The lower adhesion strength will lead to the earlier delamination of the skin film from the core which causes the cover film to fail faster. Therefore, the high resin content sample could undergo much more gravel impact cycles than the low resin content sample.

Example 3

An LWRT product that incorporated a PP homopolymer film onto the core material was tested. This skin film provides the moisture resistance, salt spray resistance and stone chipping resistance to the composite structure. In the stone impingement test, when the skin film delaminated from the core or shows cracking in the film, the underbody panel is considered to have failed the gravelometer test. Films of the same composition but different thicknesses were tested in this study to investigate the effect of skin film thickness on the stone impingement performance of the UBS panel. Table 2 shows the gravelometer test result of the molded LWRT sheets with different thickness skin films.

TABLE 2

| Effect of Film | Film Thickness | Gravelometer Test (cycles) | | Average |
|---|---|---|---|---|
| Thickness | (mil) | 1 | 2 | (cycles) |
| Sample 1 | 12 | 60 | 55 | 58 |
| Sample 2 | 8 | 25 | 35 | 30 |
| Sample 3 | 5 | 10 | 25 | 18 |

The results are consistent with the film thickness effecting stone impingement resistance. When the film thickness increased from 5 mils to 12 mils, the number of cycles until failure (using the gravelometer test) increased by more than two times. Although the thinner film usually has better adhesion to the core material, the film itself was not able to sustain the stone impact and could be broken much more easily than the thicker film.

Example 4

The effect of the melt flow index (MFI) of the resin of the core was measured to determine if changes to the MFI of the core resin altered the impact performance. MFI may be measured, for example, using ASTM D1238, condition L dated 2013 and may be expressed, for example, in g/10 min. although the units are typically omitted. The resin MFI can affect how fast the resin will be able to flow during the drying process in the oven and how well it can wet-out the glass fiber. The better wet-out usually gives the composite better mechanical strength. Two different MFI PP resins were tested: the high MFI resin had a MFI value, e.g., about 300, of about three times of the low MFI resin, e.g., about 100. The comparison of their gravelometer test results are shown in Table 3.

TABLE 3

| | Gravelometer Test (cycles) | | Average |
|---|---|---|---|
| Effect of Resin MFI | 1 | 2 | (cycles) |
| Low MFI Sample | 40 | 50 | 45 |
| High MFI Sample | 45 | 55 | 50 |

The results are consistent with a higher MFI resin, e.g., 300 or more, providing slightly higher stone impingement performance. Although the high MFI resin will help improve the wet-out of the glass fiber during the drying process, it did not seem to have a large effect on the gravelometer performance.

Example 5

The effect of a lofting agent on impact resistance was tested. A lofting agent can be added to the LWRT formulation to increase its loft capability, reducing the weight and improving the acoustical performance. The effect of the addition of lofting agent is shown in Table 4. HS1100 microsphere lofting agent was used.

TABLE 4

| Effect of Loft Agent | Gravelometer Test (cycles) 1 | 2 | Average Failure (cycles) |
|---|---|---|---|
| Sample without lofting agent | 60 | 50 | 55 |
| Sample with lofting agent | 70 | 75 | 73 |

The results are consistent with the addition of the lofting agent improving the stone impingement performance. A 30% increase was observed for the gravelometer failure cycles with the addition of this microsphere lofting agent. This lofting agent expands to a hollow sphere type of structure in the molding process. This foaming peanut type of structure appears to contribute to an improvement in the gravelometer performance.

Example 6

An underbody shield can be produced by disposing a polypropylene homopolymer film on a LWRT core board comprising about 55 weight percent or more thermoplastic polymer, glass fibers and a lofting agent. A non-woven scrim may be coupled to an opposite side of the board. The resulting composite can be further processed by thermoforming to a desired shape and/or size for use as an underbody shield.

Example 7

An underbody shield can be produced by disposing a polypropylene-polyethylene copolymer film (with more than 50% of the copolymer being polypropylene) on a LWRT core board comprising about 55 weight percent or more thermoplastic polymer, glass fibers and a lofting agent. A non-woven scrim may be coupled to an opposite side of the board. The resulting composite can be further processed by thermoforming to a desired shape and/or size for use as an underbody shield.

Example 8

An underbody shield can be produced by disposing a polypropylene homopolymer film on a LWRT core board comprising about 55-60 weight percent or more thermoplastic polymer, about 40-45 weight percent glass fibers and about 0.1-5% by weight lofting agent. A non-woven scrim may be coupled to an opposite side of the board. The resulting composite can be further processed by thermoforming to a desired shape and/or size for use as an underbody shield.

Example 9

An underbody shield can be produced by disposing a polypropylene-polyethylene copolymer film (with more than 50% of the copolymer being polypropylene) on a LWRT core board comprising about 55-60 weight percent or more thermoplastic polymer, about 40-45 weight percent glass fibers and about 0.1-5% by weight lofting agent. A non-woven scrim may be coupled to an opposite side of the board. The resulting composite can be further processed by thermoforming to a desired shape and/or size for use as an underbody shield.

Example 10

An underbody shield can be produced by disposing a polypropylene homopolymer film on a LWRT core board comprising about 55-60 weight percent or more thermoplastic polymer, about 40-45 weight percent glass fibers and about 0.1-5% by weight microsphere lofting agent. A non-woven scrim may be coupled to an opposite side of the board. The resulting composite can be further processed by thermoforming to a desired shape and/or size for use as an underbody shield.

Example 11

An underbody shield can be produced by disposing a polypropylene-polyethylene copolymer film (with more than 50% of the copolymer being polypropylene) on a LWRT core board comprising about 55-60 weight percent or more thermoplastic polymer, about 40-45 weight percent glass fibers and about 0.1-5% by weight microsphere lofting agent. A non-woven scrim may be coupled to an opposite side of the board. The resulting composite can be further processed by thermoforming to a desired shape and/or size for use as an underbody shield.

Example 12

Two LWRT boards (with two replicates of each board type) were produced that included the resin:glass ratios shown in Table 5.

TABLE 5

| LWRT | Resin:Glass Ratio | Resin MFI | Lofting Agent | Gravelometer Failure Cycles Sample 1 | Sample 2 | Average (cycles) |
|---|---|---|---|---|---|---|
| Standard LWRT | 45:55 | Low | No | 55 | 50 | 53 |
| High Gravel Resistant LWRT | 55:45 | High | Yes | 100 | 100 | 100 |

The Standard LWRT included a 1200 gsm core 45:55 resin:glass content (100 MFI polypropylene and glass fibers). The high gravel resistant LWRT included a 1200 gsm XL2 core (included about 2.8% by weight lofting agent with the balance being resin:glass content at a ratio of about 55:45 resin:glass (325MFI polypropylene and glass fibers). Both LWRT boards included a 225 gsm polypropylene film on one surface of the core the core and 35 gsm PET scrim on an opposite surface of the core. Low resin MFI refers to an MFI of about 100, and High resin MFI refers to an MFI of about 300 or more. As noted herein, MFI may be measured, for example, using ASTM D1238, condition L dated 2013.

The film side of each board was subjected to gravelometer cycles until failure or 100 cycles total (end of the test). As shown in Table 5, the standard LWRT board failed after an average of 53 gravelometer cycles. The resistant LWRT board did not fail after the 100 cycles. These results are consistent with selection of the resin:glass ratio and resin MFI to provide a LWRT with higher gravel resistance.

Example 13

Three LWRT boards were produced with the materials shown in Table 6.

TABLE 6

| Composition | Name |
| --- | --- |
| 900 gsm core + 4 mm thick 225 gsm EXV2601-0499 polypropylene film (modified polypropylene film 1) | ST-10499 |
| 900 gsm core + 4 mm thick 225 gsm EXV2601-0500 polypropylene film (modified polypropylene film 2) | ST-10500 |
| 900 gsm core + 4 mm thick 225 gsm polypropylene film (unmodified film) | ST-10198 |

ST-10499 included a 900 gsm XL2 core (as noted in Example 12) with a 225 gsm EXV2601-0499 polypropylene film one on surface of the XL2 core and a 35 gsm PET scrim on an opposite surface of the XL2 core. ST-10500 included a 900 gsm XL2 core with a 225 gsm EXV2601-0500 polypropylene film on one surface of the XL2 core and a 35 gsm PET scrim on an opposite surface of the XL2 core. ST-10198 included a 900 gsm XL2 core with a 225 gsm polypropylene film on one surface of the XL2 core and a 35 gsm PET scrim on an opposite surface of the XL2 core.

Figure 12A:
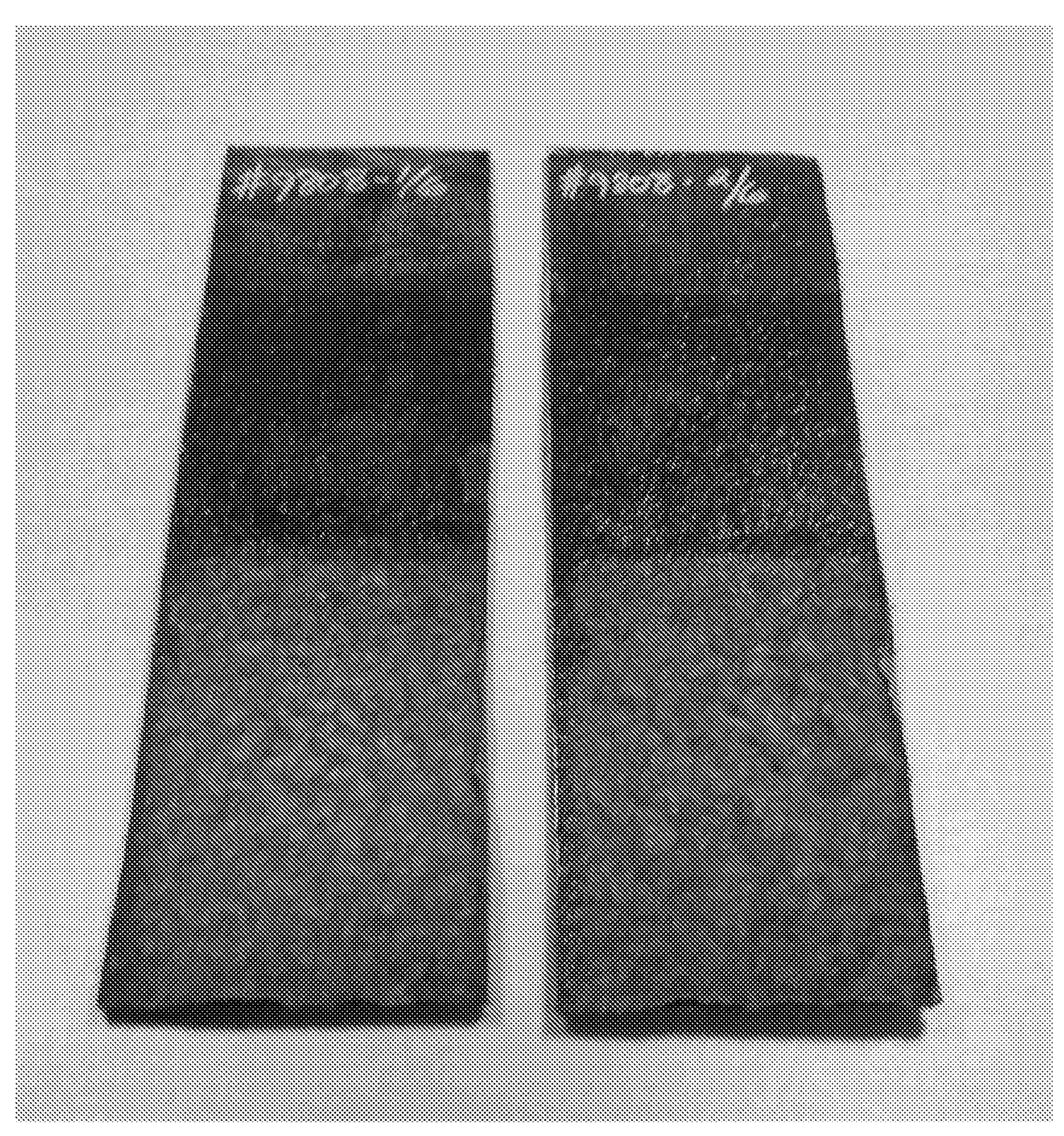
FIGS. 12A-12C are photographs of various boards subjected to a gravelometer test.
Figure 12B:
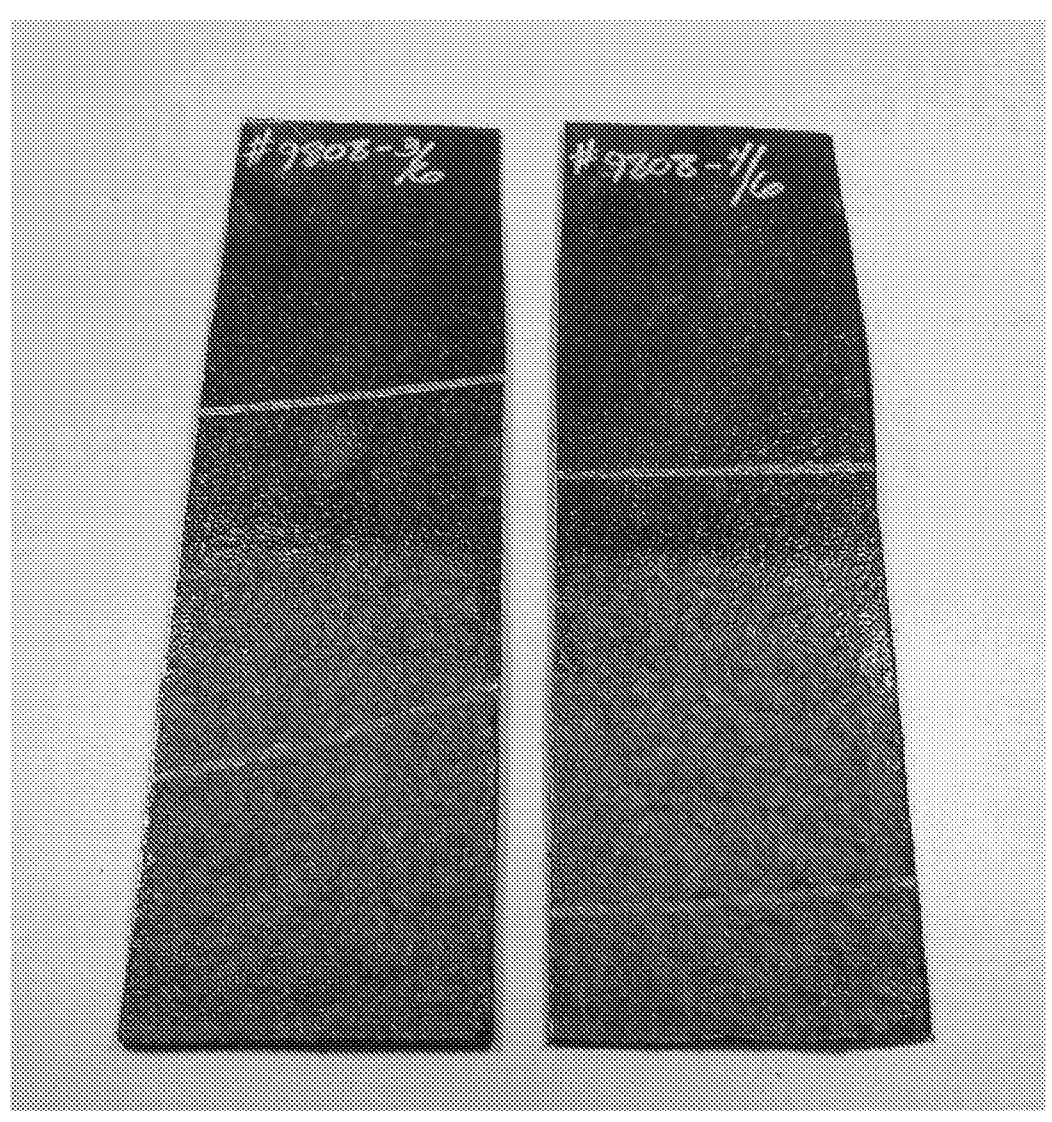
Figure 12C:
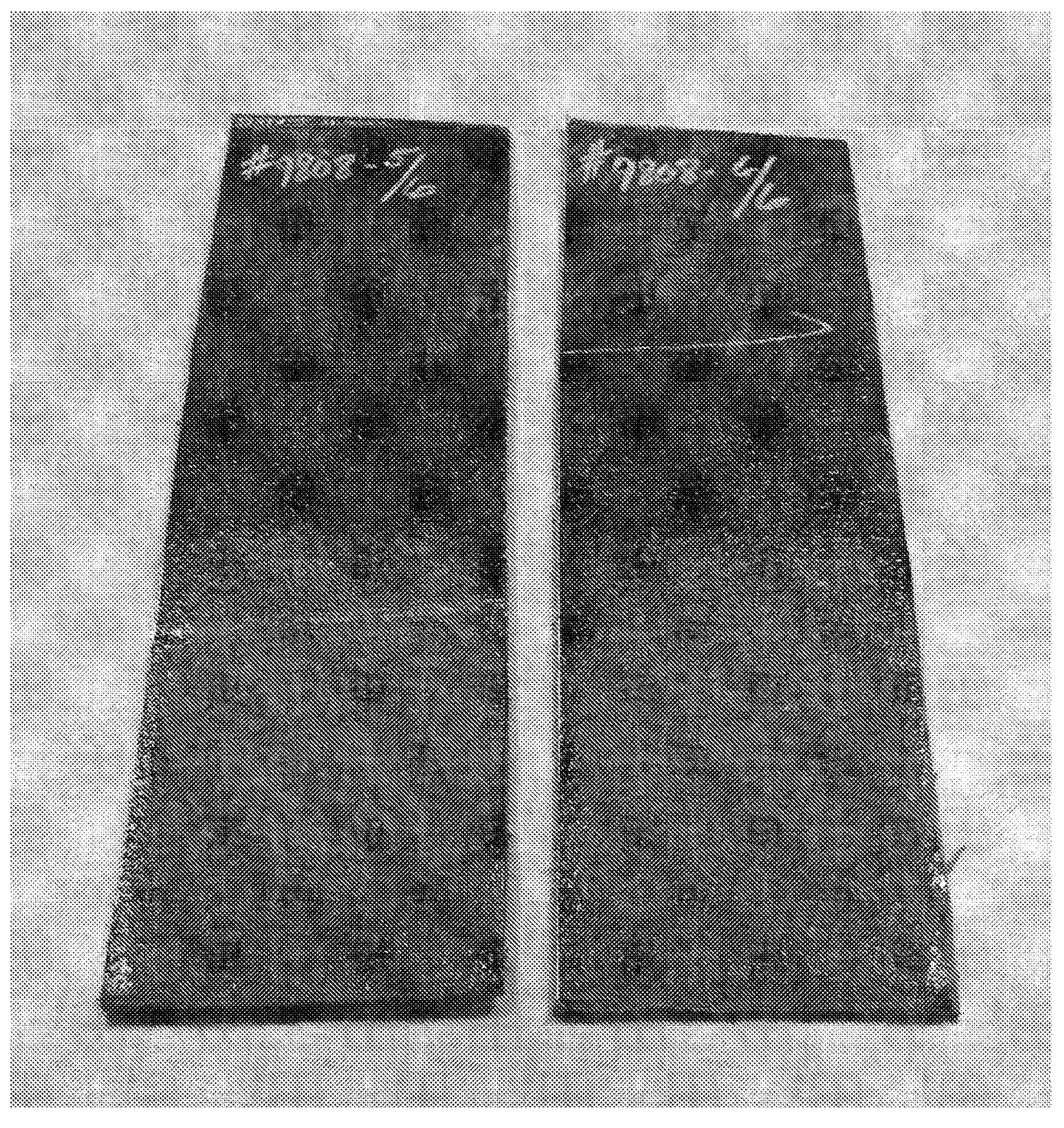

The film side of each of the boards in Table 6 was subjected to a gravelometer test. Each board was subjected to 100 kg of gravel at a 90 degree angle to the film surface after the boards were placed against a ⅛ inch steel backing panel. 70 psi of pressure was used. 2 replicates of each board were tested for a total of six boards. Photographs of the sample boards after testing are shown in FIGS. 12A-12C. FIG. 12A is a photograph of the two ST-10198 boards, FIG. 12B is a photograph of the two ST-10499 boards, and FIG. 12C is a photograph of the two ST-10500 boards. None of the boards exhibited any objectionable degradation, delamination, cracking, blistering, core exposure, weight loss of other changes that altered the boards after the gravelometer testing. These results were consistent with the combination of the core and films providing increased impact resistance compared to a standard LWRT board.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A method of forming an impact resistant composite prepreg comprising:

combining a thermoplastic polyolefin polymer comprising a melt flow index of at least 300 g/10 min as tested by ASTM D1238, condition L dated 2013, reinforcing fibers and a lofting agent in an aqueous solution;

mixing the aqueous solution comprising the thermoplastic polyolefin polymer, reinforcing fibers and microsphere lofting agents to disperse the reinforcing fibers and the microsphere lofting agent in the thermoplastic polyolefin polymer to provide an aqueous foam dispersion, wherein the thermoplastic polyolefin polymer is present at 50% by weight or more in the aqueous solution, and wherein the microsphere lofting agents do not loft at 180 degrees Celsius and loft above 210 degrees Celsius;

disposing the aqueous foam dispersion onto a forming element;

removing liquid from the disposed aqueous foam to provide a web comprising the thermoplastic polyolefin polymer, the reinforcing fibers and the lofting agent;

heating the web above a softening temperature of the thermoplastic polyolefin polymer of the web without lofting of the microsphere lofting agents;

disposing a copolymer polyolefin film on a first surface of the web, wherein the copolymer polyolefin film comprises a thickness of at least 10 mils;

disposing a polyester non-woven scrim on a second surface of the web to provide a composite prepreg; and lofting the composite prepreg at a temperature above 210 degrees Celsius to expand the microsphere lofting agent in the composite prepreg into hollow sphere structures and provide a post-lofted prepreg, wherein a ratio of the thermoplastic polyolefin polymer to reinforcing fibers in the web is selected so the post-lofted prepreg can withstand at least 50 individual impacts according to a SAE J400 protocol without damage to the disposed polyolefin homopolymer film or copolymer polyolefin film on the first surface, wherein the SAE J400 protocol subjects the polyolefin copolymer film of a 100 mm×300 mm plaque of the post-lofted prepreg to individual 90 degree impacts using 8 to 16 mm diameter road gravel with the post-lofted prepreg placed against a ⅛ inch steel backing, wherein the road gravel is provided at 8+/−2 second intervals using an air pressure of 70 psi, and wherein damage to the polyolefin copolymer film comprises delamination of the polyolefin copolymer film from the post lofted core layer or cracking of the polyolefin copolymer film.

2. The method of claim 1, further comprising compressing the composite prepreg to a predetermined thickness to form a composite article prior to lofting.

3. The method of claim 1, further comprising configuring the thermoplastic polyolefin polymer as a polypropylene resin comprising a melt flow index of at least 300 g/10 min. as tested by ASTM D1238, condition L dated 2013, and configuring the reinforcing fibers as glass fibers.

4. The method of claim 1, further comprising configuring the copolymer polyolefin film to have a thickness of at least 20 mils.

5. The method of claim 4, further comprising configuring the thermoplastic polyolefin polymer to be present at 55% by weight or more in the aqueous solution.

6. The method of claim 1, wherein the thermoplastic polyolefin polymer is polypropylene resin and the reinforcing fibers are glass fibers, and wherein the thermoplastic polypropylene polymer resin and glass fibers are present in the web in a 55:45 ratio.

7. The method of claim 6, wherein impact resistance of the lofted prepreg increases at least 30% compared to a comparable composite prepreg lacking the lofting agent.

8. The method of claim 6, wherein the melt flow index of the resin is at least 325 g/10 min as tested by ASTM D1238, condition L dated 2013, and wherein the lofted prepreg can withstand at least 100 individual impacts according to a SAE J400 protocol without damage to the disposed copolymer polyolefin film on the first surface.

9. The method of claim 1, wherein the copolymer polyolefin film comprises a polypropylene-polyethylene copolymer film.

10. A method of forming a composite article comprising:

combining a polypropylene resin having a melt flow index of 300 g/10 min or more, reinforcing glass fibers and a lofting agent in an aqueous solution, wherein the lofting agent comprises a binary lofting agent that expands from no loft to full loft after application of heat, wherein the binary lofting agent does not loft at 180 degrees Celsius and lofts at a lofting temperature above 210 degrees Celsius, wherein the polypropylene resin is present at 50% by weight or more in the aqueous solution;

mixing the aqueous solution comprising the polypropylene resin, reinforcing glass fibers and lofting agent to disperse the reinforcing glass fibers and the microsphere lofting agent in the polypropylene to provide an aqueous foam dispersion;

disposing the aqueous foam dispersion onto a forming element;

removing liquid from the disposed aqueous foam to provide a porous core layer comprising a web formed from the polypropylene, the reinforcing glass fibers and the lofting agent trapped in void space of the formed web;

heating the porous core layer above a softening temperature of the thermoplastic polymer resin of the porous core layer and below the lofting temperature of the binary lofting agent;

disposing an impact resistant film on a first surface of the porous core layer, wherein the impact resistant film is a copolymer polyolefin film, wherein the impact resistant film comprises a thickness of at least 10 mils;

disposing a scrim on a second surface of the porous core layer to provide a composite article;

compressing the composite article to a selected thickness; and lofting the binary lofting agent by heating the compressed composite article above the lofting temperature to provide a lofted composite article, in which a ratio of the polypropylene resin to reinforcing glass fibers in the porous core layer is selected so the lofted composite article can withstand at least 50 individual impacts according to a SAE J400 protocol without damage to the disposed impact resistant film, wherein the SAE J400 protocol subjects the polyolefin copolymer film of a 100 mm×300 mm plaque of the lofted composite article to individual 90 degree impacts using 8 to 16 mm diameter road gravel with the lofted composite article placed against a ⅛ inch steel backing, wherein the road gravel is provided at 8+/−2 second intervals using an air pressure of 70 psi, and wherein damage to the polyolefin copolymer film comprises delamination of the polyolefin copolymer film from the post lofted core layer or cracking of the polyolefin copolymer film.

11. The method of claim 10, further comprising selecting the scrim as a scrim that comprises glass fibers, aramid fibers, graphite fibers, carbon fibers, inorganic mineral fibers, metal fibers, metalized synthetic fibers, or metalized inorganic fibers.

12. The method of claim 10, in which the impact resistant film and the scrim are simultaneously disposed on the porous core layer.

13. The method of claim 10, further comprising configuring each of the polypropylene resin and the binary lofting agent as particles with about the same average particle diameter.

14. The method of claim 10, wherein the polypropylene resin and glass fibers are present in the porous core layer in a 55:45 ratio.

15. The method of claim 14, wherein the melt flow index of the polypropylene resin is at least 325 g/10 min as tested by ASTM D1238, condition L dated 2013, and wherein the lofted prepreg can withstand at least 100 individual impacts according to a SAE J400 protocol without damage to the disposed copolymer polyolefin film on the first surface.

16. The method of claim 14, wherein the copolymer polyolefin film comprises a polypropylene-polyethylene copolymer film.

* * * * *